(12) United States Patent
Adachi et al.

(10) Patent No.: US 8,767,235 B2
(45) Date of Patent: Jul. 1, 2014

(54) IMAGE PROCESSING SYSTEM, IMAGE RECEIVING APPARATUS, AND IMAGE RECEIVING METHOD IMAGE RECEIVING METHOD FOR MANAGEMENT OF FAX DATA PROVIDED BY A COLLABORATION OF AN IMAGE FORMING APPARATUS AND AN EXTERNAL APPLICATION

(75) Inventors: Shinichi Adachi, Yokohama (JP);
Michihiko Tsuda, Yokohama (JP);
Susumu Fujioka, Zama (JP)

(73) Assignee: Ricoh Company, Ltd., Tokyo (JP)

( * ) Notice: Subject to any disclaimer, the term of this patent is extended or adjusted under 35 U.S.C. 154(b) by 467 days.

(21) Appl. No.: 13/019,543

(22) Filed: Feb. 2, 2011

(65) Prior Publication Data

US 2011/0222113 A1    Sep. 15, 2011

(30) Foreign Application Priority Data

Mar. 15, 2010    (JP) .................................. 2010-057157

(51) Int. Cl.
*G06F 3/12* (2006.01)
*G06F 17/00* (2006.01)

(52) U.S. Cl.
USPC ......................................... 358/1.15; 358/500

(58) Field of Classification Search
USPC ............ 358/1.13, 1.14, 1.15, 3.28, 1.18, 500, 358/400, 405, 407; 709/201, 203, 219, 229
See application file for complete search history.

(56) References Cited

U.S. PATENT DOCUMENTS

| | | | | |
|---|---|---|---|---|
| 6,529,293 | B1 * | 3/2003 | Otsuka | 358/434 |
| 7,295,337 | B2 * | 11/2007 | Eguchi et al. | 358/1.15 |
| 7,420,698 | B2 * | 9/2008 | Ferlitsch | 358/1.15 |
| 8,130,395 | B2 * | 3/2012 | Shimizu et al. | 358/1.15 |
| 2006/0291453 | A1 * | 12/2006 | Kuwahara | 370/352 |
| 2009/0077216 | A1 | 3/2009 | Rhodes et al. | |
| 2010/0165388 | A1 | 7/2010 | Ikeura | |

FOREIGN PATENT DOCUMENTS

JP    2001-186318    7/2001

* cited by examiner

*Primary Examiner* — Gabriel Garcia
(74) *Attorney, Agent, or Firm* — Oblon, Spivak, McClelland, Maier & Neustadt, L.L.P.

(57) ABSTRACT

An image processing system including a first image forming apparatus that sends fax data, and a second image forming apparatus that receives fax data sent from the first image forming apparatus via a communication link. The system also includes a first information processing apparatus connected to the first image forming apparatus, and which provides the fax data to the first image forming apparatus. The first information processing apparatus may include an identifier adding unit that adds an identifier indicating a process to be performed on the fax data by the second image forming apparatus, and a data sending unit that controls the first image forming apparatus to send the fax data in response to an instruction from the first image forming apparatus.

7 Claims, 21 Drawing Sheets

FIG. 8

WIDGET MANAGER URI : http://<ADDRESS>:<PORT NUMBER>/widgets/ —401

WIDGET URI (A) : http://<ADDRESS>:<PORT NUMBER>/widgets/<WIDGET ID_A> —410
 └FAX SENDING JOB URI (1) : http://<ADDRESS>:<PORT NUMBER>/widgets/<WIDGET ID_A>/jobs/<JOB ID_(1)> —411
 └FAX SENDING JOB URI (2) : http://<ADDRESS>:<PORT NUMBER>/widgets/<WIDGET ID_A>/jobs/<JOB ID_(2)> —412
 └FAX SENDING JOB URI (3) : http://<ADDRESS>:<PORT NUMBER>/widgets/<WIDGET ID_A>/jobs/<JOB ID_(3)> —413

WIDGET URI (B) : http://<ADDRESS>:<PORT NUMBER>/widgets/<WIDGET ID_B> —420
 └FAX SENDING JOB URI (1) : http://<ADDRESS>:<PORT NUMBER>/widgets/<WIDGET ID_B>/jobs/<JOB ID_(1)> —421
 └FAX SENDING JOB URI (2) : http://<ADDRESS>:<PORT NUMBER>/widgets/<WIDGET ID_B>/jobs/<JOB ID_(2)> —422
 └FAX SENDING JOB URI (3) : http://<ADDRESS>:<PORT NUMBER>/widgets/<WIDGET ID_B>/jobs/<JOB ID_(3)> —423

WIDGET URI (C) : http://<ADDRESS>:<PORT NUMBER>/widgets/<WIDGET ID_C> —430
 └FAX SENDING JOB URI (1) : http://<ADDRESS>:<PORT NUMBER>/widgets/<WIDGET ID_C>/jobs/<JOB ID_(1)> —431
 └FAX SENDING JOB URI (2) : http://<ADDRESS>:<PORT NUMBER>/widgets/<WIDGET ID_C>/jobs/<JOB ID_(2)> —432
 └FAX SENDING JOB URI (3) : http://<ADDRESS>:<PORT NUMBER>/widgets/<WIDGET ID_C>/jobs/<JOB ID_(3)> —433

FIG. 10

| USER ID | WIDGET MANAGER URI |
|---|---|
| USER A | http://xxxxx:yyyy/widgets/ |
|  |  |
|  |  |

| USER ID | AAA |
|---|---|
| WIDGET ID | 94d5dd11 |
| WIDGET NAME | FaxSend |
| COORDINATION FUNCTION IDENTIFIER | print |
| DISPLAY NAME | FAX SEND |
| : | : |

| USER ID | AAA |
| --- | --- |
| JOB NAME | DOCUMENT A |
| : | : |
| FAX DATA | .... |

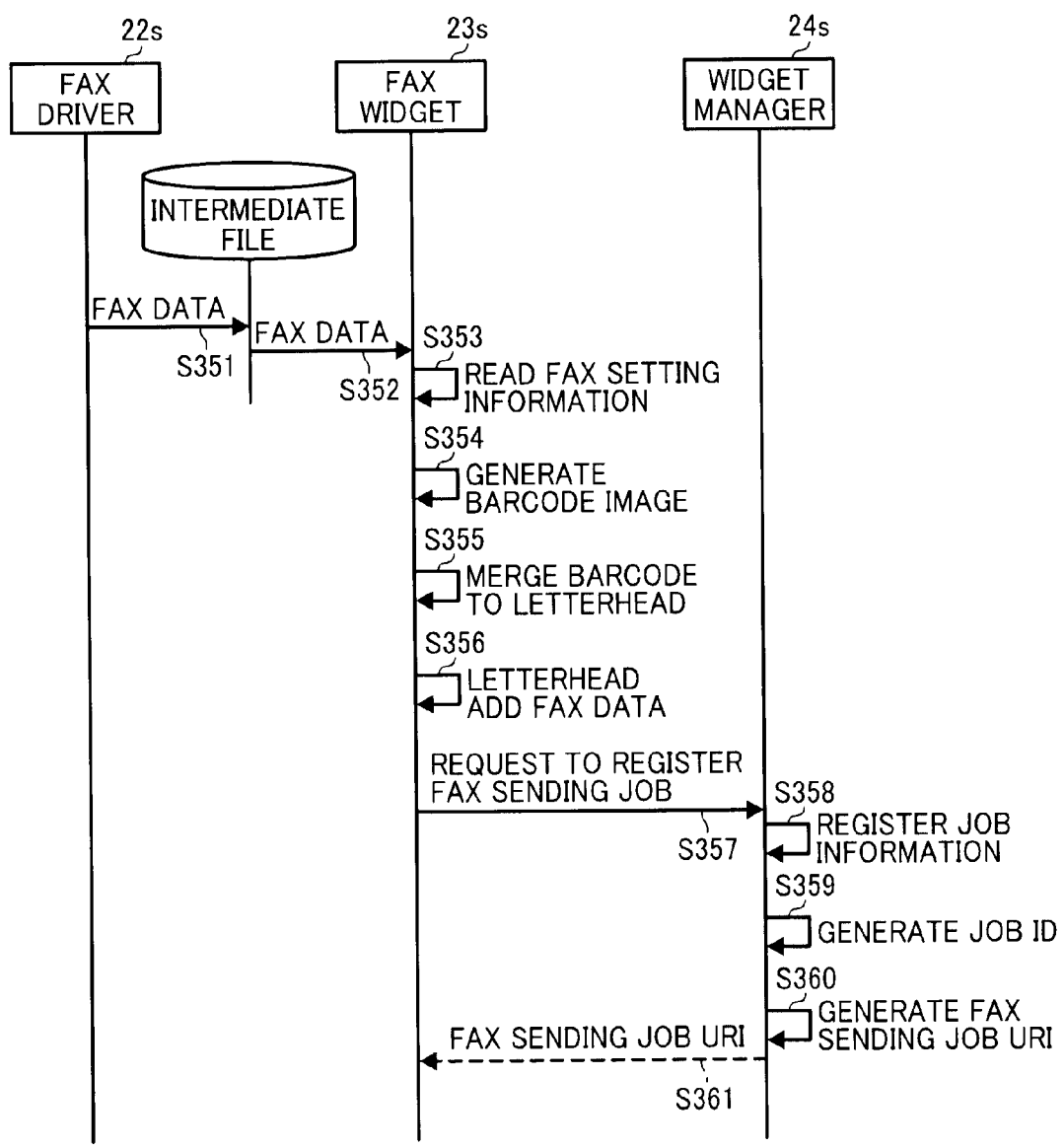

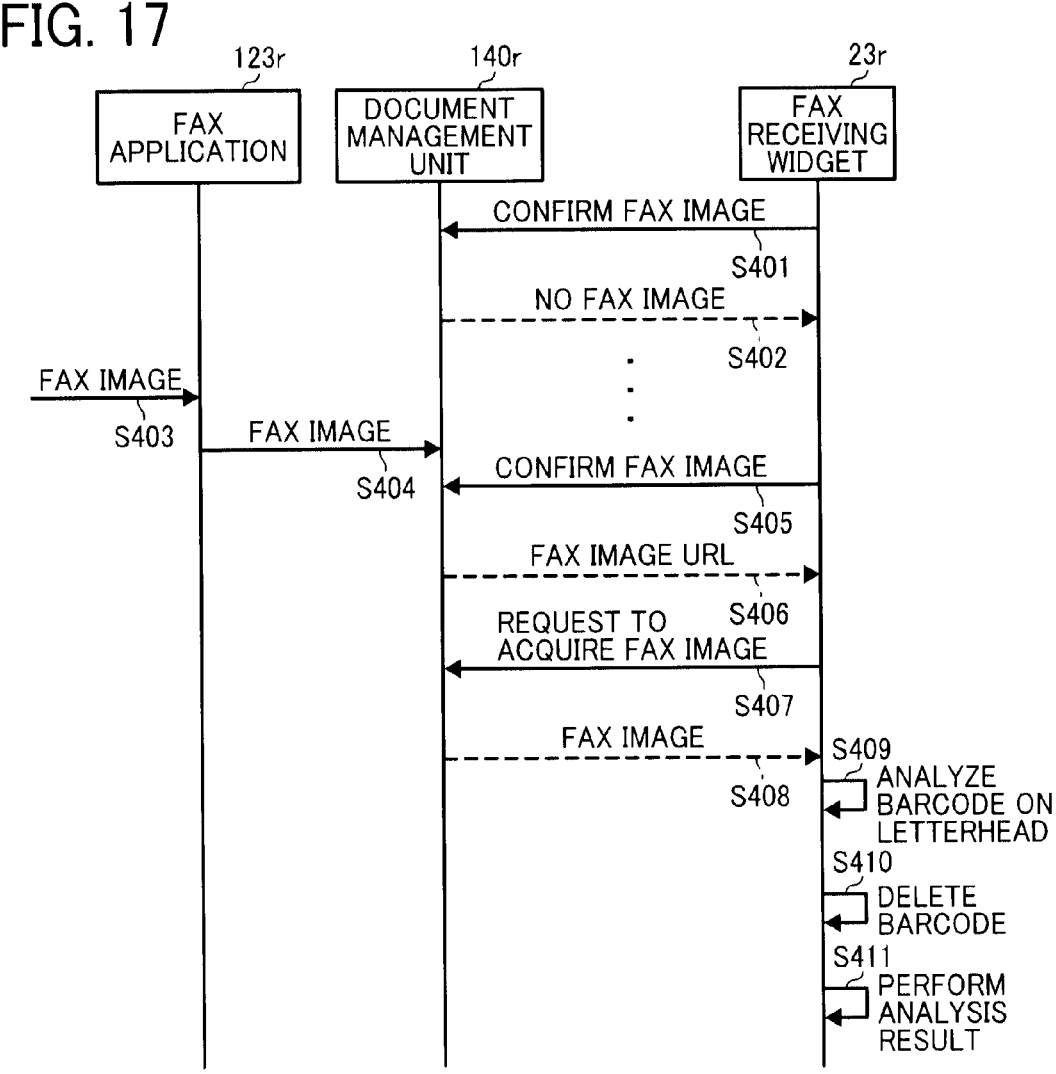

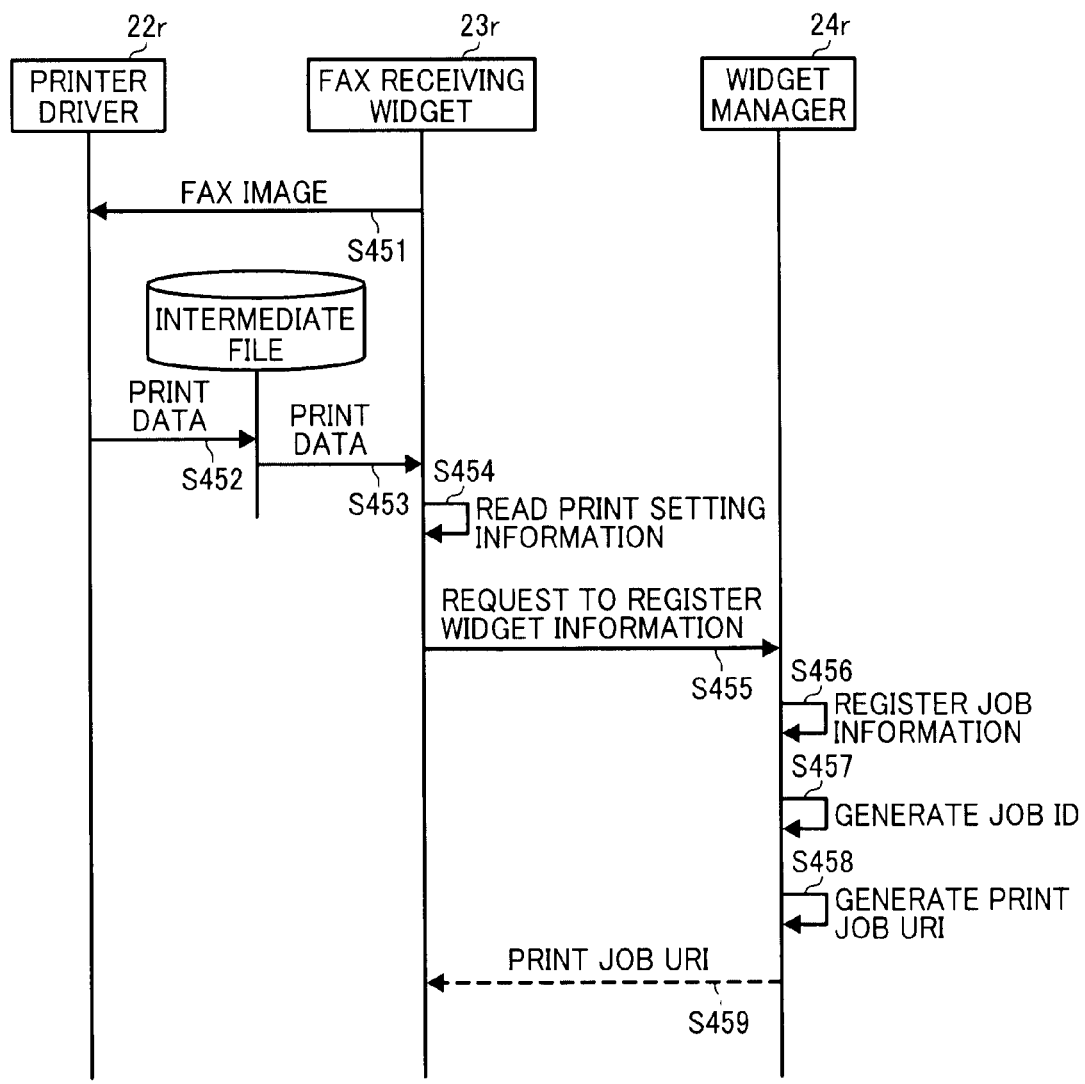

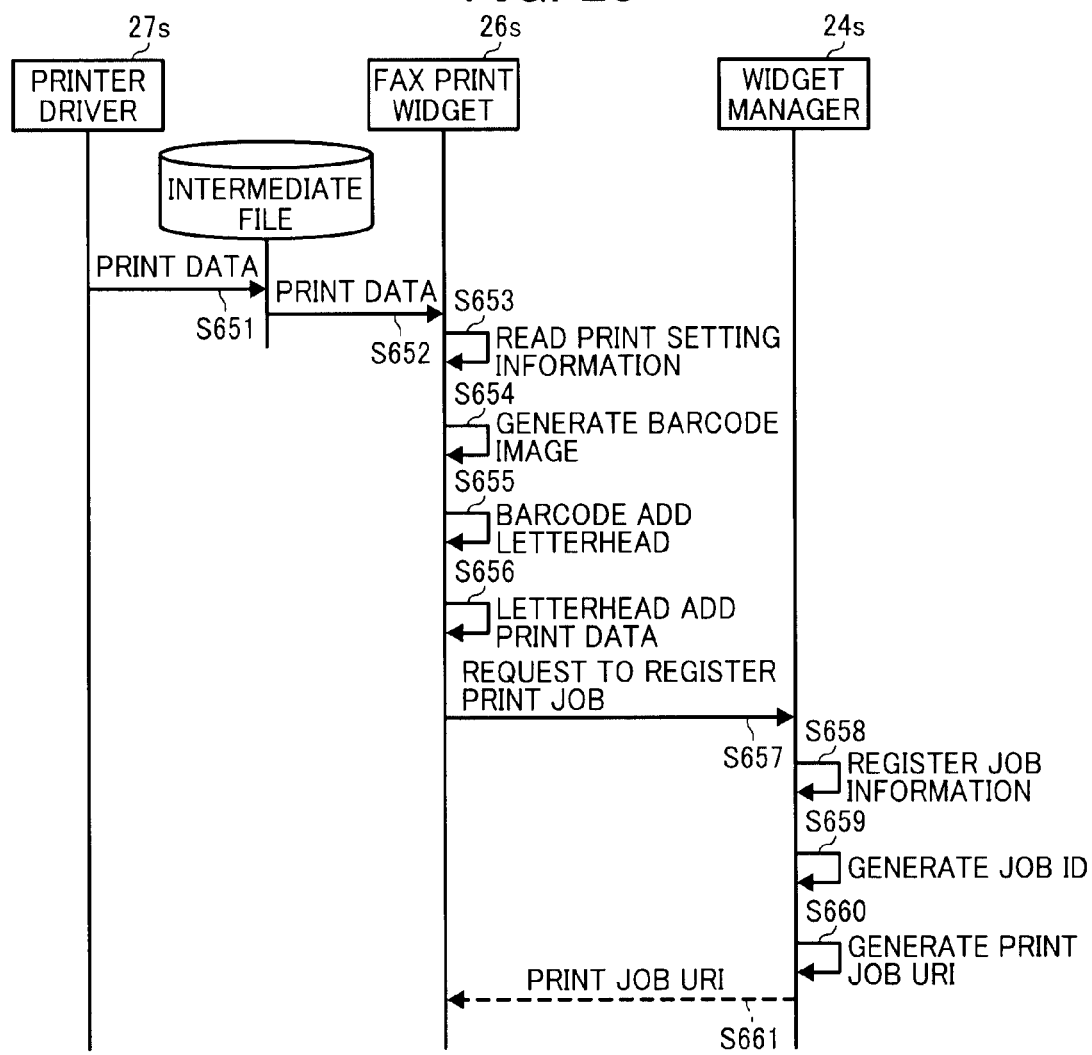

IMAGE PROCESSING SYSTEM, IMAGE RECEIVING APPARATUS, AND IMAGE RECEIVING METHOD IMAGE RECEIVING METHOD FOR MANAGEMENT OF FAX DATA PROVIDED BY A COLLABORATION OF AN IMAGE FORMING APPARATUS AND AN EXTERNAL APPLICATION

CROSS-REFERENCE TO RELATED APPLICATION(S)

This application claims the benefit of priority under 35 U.S.C. §119 from Japanese Patent Application No. 2010-057157 filed Mar. 15, 2010, the entire contents of which is incorporated by reference herein.

BACKGROUND OF THE INVENTION

1. Field of the Invention

The present invention relates to an image processing system, an image receiving apparatus, an image receiving method.

2. Description of the Related Art

In the past, it was common to receive fax correspondence at a fax device, and to distribute the correspondence by hand to the intended recipients of the fax communications. In other words, the addressee would be determined based on a printed address on a letterhead of the fax.

On the other hand, facsimile devices exist that can automatically determine a distribution address based on an optional identifier added to fax data, such as an F-code. It is possible, for example, to construct workflow systems for controlling distribution addresses based on the F-code with the facsimile.

However, from a sender's point of view, it is burdensome to input another code in addition to a fax number. Otherwise stated, adding an F-code to fax data is a burden to the user, and if there is a workflow constructed with F-code, then the workflow may not be accomplished if the F-code is omitted.

SUMMARY OF THE INVENTION

The present invention provides an image processing apparatus, an image receiving apparatus, and an image receiving method in which one or more of the above-described disadvantages are eliminated.

A preferred embodiment of the present invention provides an image processing apparatus, an image receiving apparatus, and an image receiving method with which a simple mechanism is implemented for management fax data that is provided by collaboration of an image forming apparatus and an external application.

According to an aspect of the present invention, there is disclosed an image processing system including a first image forming apparatus configured to send fax data, and a second image forming apparatus configured to receive fax data sent from the first image forming apparatus via a communication link. The system also includes a first information processing apparatus connected to the first image forming apparatus, and configured to provide the fax data to the first image forming apparatus. The first information processing apparatus may include an identifier adding unit configured to add an identifier indicating a process to be performed on the fax data by the second image forming apparatus, and a data sending unit configured to control the first image forming apparatus to send the fax data in response to an instruction from the first image forming apparatus. According to an aspect of the present invention, there is disclosed an image receiving apparatus connected to an image forming apparatus via a network. The image receiving apparatus includes a monitoring unit configured to monitor the image forming apparatus to confirm whether fax data is received, a data receiving unit configured to acquire the fax data from the image forming apparatus based on a result of the monitoring, and a process determination unit configured to determine a process to be performed on the fax data based on image data added to the fax data.

According to an aspect of the present invention, there is disclosed a non-transitory computer-readable medium including computer program instructions, which when executed by an image receiving apparatus connected to an image forming apparatus via a network, cause the image receiving apparatus to perform a method. The method includes monitoring the image forming apparatus to confirm whether fax data is received, acquiring the fax data from the image forming apparatus based on a result of the monitoring; and determining a process to be performed on the fax data based on image data added to the fax data.

It is to be understood that both the foregoing general description and the following detailed description are exemplary and explanatory only and are not restrictive of the invention, as claimed.

BRIEF DESCRIPTION OF THE DRAWINGS

Other objects, features and advantages of the present invention will become more apparent from the following detailed description when read in conjunction with the accompanying drawings, in which:

FIG. 8 illustrates exemplary contents of each of the URIs according to the first embodiment;

FIG. 10 illustrates a structural example of a user information table;

FIG. 11 illustrates a structural example of the widget information piece of the fax widget according to the first embodiment;

FIG. 16 is a sequence diagram showing a process performed when registering the fax sending job into the widget manager according to the second embodiment;

FIG. 17 is a sequence diagram showing a process performed when receiving fax image according to the second embodiment;

FIG. 18 illustrates a structural example of the widget information piece of the fax receiving widget according to the second embodiment;

FIG. 19 is a sequence diagram showing a process performed when registering the print job of fax image into the widget manager according to the second embodiment;

FIG. 20 illustrates a structural example of the print job information according to the second embodiment;

FIG. 27 illustrates a structural example of the widget information piece of the fax print widget according to the fourth embodiment;

FIG. 28 is a sequence diagram showing a process performed when registering the fax print job into the widget manager according to the fourth embodiment.

DETAILED DESCRIPTION OF THE PREFERRED EMBODIMENTS

A description is given below, with reference to the accompanying drawings, of embodiments of the present invention.
[First Embodiment]

Figure 1:
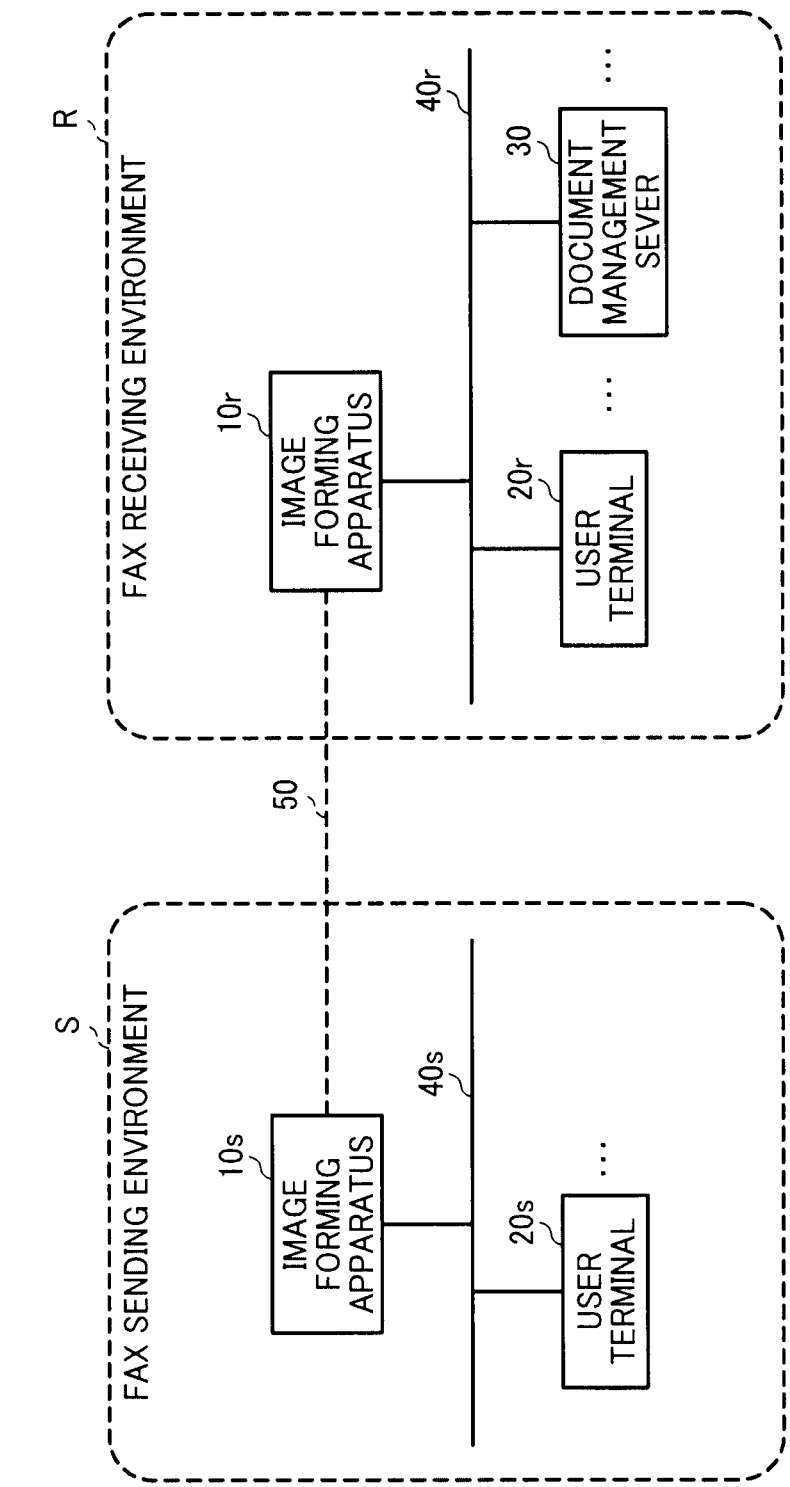
FIG. 1 illustrates a configuration of a facsimile communication system of according to the first embodiment of the present invention.

FIG. 1 illustrates a configuration of a facsimile communication system of according to the first embodiment of the present invention. The facsimile communication system 1 includes a fax sending environment S and a fax receiving environment R. The fax sending environment is a user environment for sending faxes. The fax receiving environment is a user environment for receiving the faxes sent from the fax sending environment. However, it is assumed that a relationship between the fax sending environment and the fax receiving environment are formally-defined in the present embodiment. The ability to send and receive faxes may be available in each environment. For convenience of description, each of the fax environments is assumed to belong to different companies.

In the fax sending environment of FIG. 1, one or more image forming apparatuses 10s and one or more user terminals 20s are connected via a wired or wireless network 40s such as a local area network (LAN). In the fax receiving environment of FIG. 1, one or more image forming apparatuses 10r, one or more user terminals 20r, and a document management server 30 are connected via a wired or wireless network 40r such as a local area network (LAN).

For simplicity, the description below may refer to "image forming apparatus 10" without distinguishing between an image forming apparatus at the sending or receiving environment. Similarly, the description may refer to "user terminal 20" without distinguishing between an image forming apparatus at the sending or receiving environment.

The user terminals 20 are terminals used by users, and software programs may be installed and implemented in the user terminals 20 An example of the user terminals 20 is a desktop personal computer (PC), a notebook personal computer, a personal digital assistance (PDA), a mobile phone, or the like.

The image forming apparatus 10 is a multifunction peripheral, which can realize one or a plurality of printing, scanning, copying, and fax transmission functions within a single housing. However, the image forming apparatus 10s may include at least a function of sending faxes and the image forming apparatus 10r may include at least a function of receiving faxes. In this case, the image forming apparatus 10s and the image forming apparatus 10r may be connected via a phone lines An address of the document manager server is an example of distribution address. The image forming apparatus 10r automatically determines a process performed for fax data based on an F-code included the fax data. Specifically, an e-mail addresses or folder names for the document management server 30 may be registered as being related to an F-code. The image forming apparatus 10r sends received fax data to the mail address or the folder name for the document management server 30 based on the F-code included the received fax data via the network 40r.

The F-code is an example of an identifier used for distributing the fax without specifying a fax number when sending fax. A similar identifier having the same purpose of the F-code may be used instead of an F-code.

Figure 2:
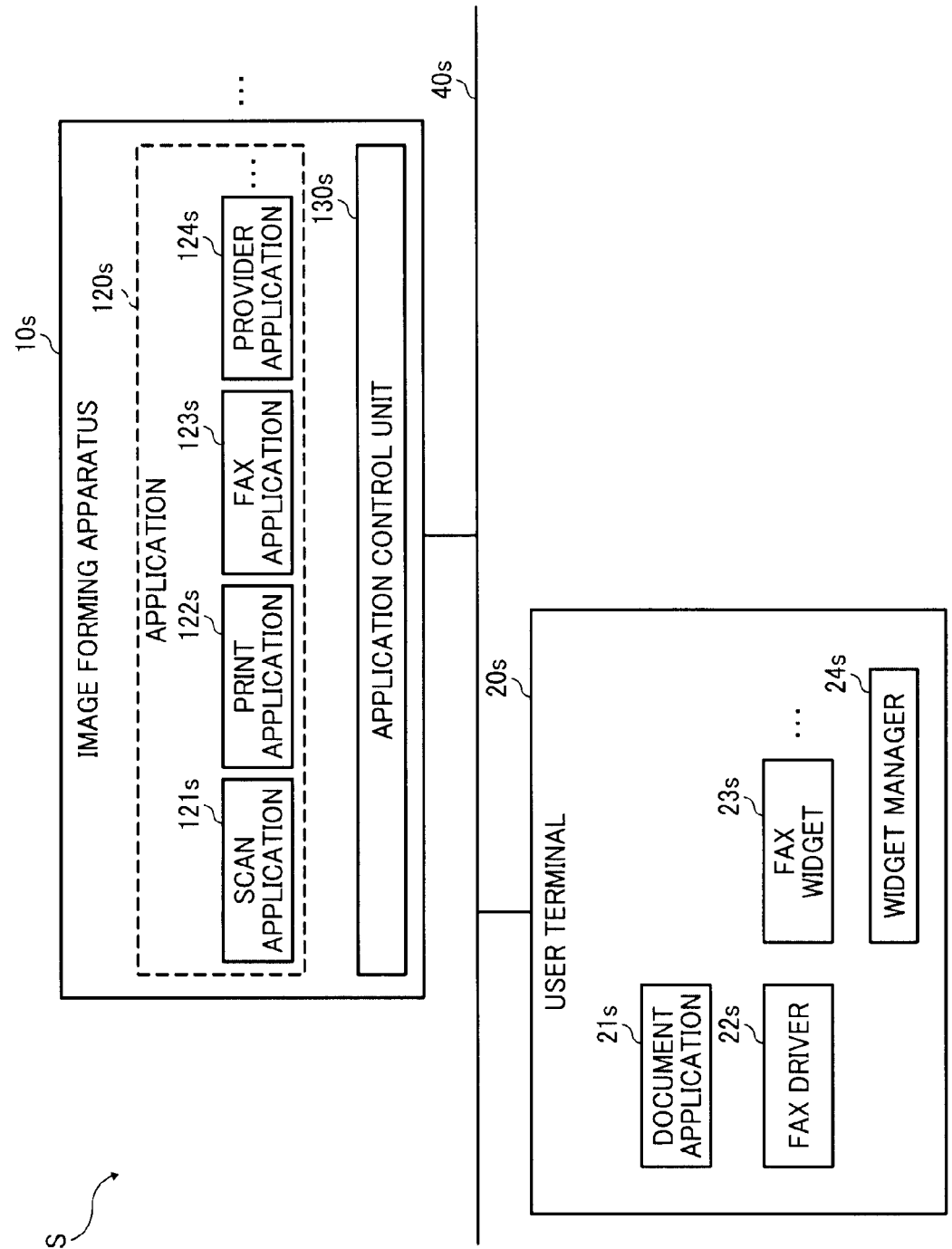
FIG. 2 illustrates a software configuration of each apparatuses in the fax sending environment according to the first embodiment.

FIG. 2 illustrates a software configuration of each apparatuses in the fax sending environment according to the first embodiment. The user terminal 20s includes one or more document applications 21s, a fax driver 22s, a fax widget 23s, a widget manager 24s, or the like.

The document application 21s includes an application for producing document data to be printed such as word processor software and spreadsheet software. The fax driver 22s converts document data to fax data, which can be sent as faxes by the image forming apparatus 10 such as a Tagged Image File Format (TIFF) with fax control information (for example, fax number). The fax driver 22s is therefore known as a program similar to a printer driver.

A user can send faxes with the fax driver 22s by a procedure similar to that used to print documents edited in the document application 21s. For example, a print dialog box of the document application 21s includes a logical printer corresponding to the fax driver 22s (logical fax). The fax driver 22s can display a properties screen page from the logical fax. The user can input fax setting information for the fax control information in the properties screen page. After inputting the fax setting information, in response to an instruction to print in the print dialog box, the fax driver generates a fax data corresponding to the document edited in the document application 21s. Generally, the fax data is sent to a printer port of the image forming apparatus.

In this embodiment, the fax driver 22s is configured to output generated fax data as a file having a predetermined file name without outputting the generated fax data to the printer port.

The fax widget 23s is one mode of the application program collectively referred to as "widget" in this embodiment. Herein, the terminology "widget" is used to represent a software program having a characteristic of being easily installed. This terminology is used without limiting any technical feature of "widget". The widget remotely uses the function of the image forming apparatus 10s and provides a predetermined service (for example, a sequence of processes such as a work flow) to the user. For example, the fax widget 23s carries out a process of sending faxes using the image forming apparatus 10s.

In this embodiment, a fax number is specified as fax setting information of the fax widget 23s for one of the image forming apparatuses 10r in the fax receiving environment in advance. An F-code is specified as fax setting information of the fax widget 23s in advance by someone in the fax receiving environment. Each of plural fax widgets 21s can specify a fax number and F-code different from other fax widgets. For example, it is possible to specify a fax number and F-code requested by a certain business partner in a fax receiving environment as fax setting information of a fax widget installed in user terminal 20s. Such a configuration eliminates the need to specify both the fax number and F-code when sending a fax.

Although not illustrated, a scan widget or a print widget may further exist. The scan widget causes the image forming apparatus 10s to scan a document or the like, store the scanned image data into the user terminal 20s, or process the scanned image data to be delivered. The print widget causes the image forming apparatus 10s to print input data.

The widget manager 24s shares the framework of the widget. The widget manager intermediates between the widget and the image forming apparatus 10s. Each widget has an interface determined by the widget manager 24s and a procedure determined by the widget manager 24s. Otherwise stated, the program operates in coordination with the widget manager 24s. In the present embodiment, the fax widget 23s requests registration of the fax job to the widget manager 24s. The widget manager 24s stores information related to the fax job requested (fax setting information, fax data, or the like).

The image forming apparatus 10s has software such as an application 120s and an application control unit 130s. The application 120s is a program which carries out the job requested by the user. Further, a scan application 121s, a print application 122s, a fax application 123s, and a provider application 124s are exemplified as applications 120. The scan application 121s carries out a scanning job. The print application 122s carries out print jobs. The fax application 123s carries out fax sending jobs and fax receiving job.

A printer port is defined in relation to the print application 122s. Therefore, the print application 122s receives fax data generated by the fax driver 22s similar to the way it would receive print data. The print application 122s sends received data to the fax application 123s if the print application 122s recognizes the received data as a fax data by referencing a part of the received data such as header information. However, a fax port may be defined in relation to the fax application 123s. In this case, fax data generated by the fax driver 22s may be sent to the fax port from the user terminal 20s.

The provider application 124s carries out coordination between the image forming apparatus 10s and the widget (in a strict sense, the widget manager 24s). For example, the provider application 124s acquires a fax sending job registered in the widget manager 24s and causes the image forming apparatus 10s to carry out the fax sending job. The application control unit 130s intermediates between the applications 120s. For example, the application control unit 130s switches an active application 120 in response to an operation instruction from the user. An operation screen of the active application 120s is displayed on an operations panel of the image forming apparatus 10s. The active application 120s may be operated via an operations panel.

A software configuration of the image forming apparatus in the fax receiving environment is a similar configuration shown in FIG. 2. If it is necessary to distinguish between substructures of the image forming apparatuses 10s and the image forming apparatuses 10r, the substructures of the widget manager 24s are distinguished by a symbol including an 's' or 'r' suffix of widget manager 24r. Such a convention is used throughout the description in relation to a hardware configuration of the image forming apparatus, as described below.

Figure 3:
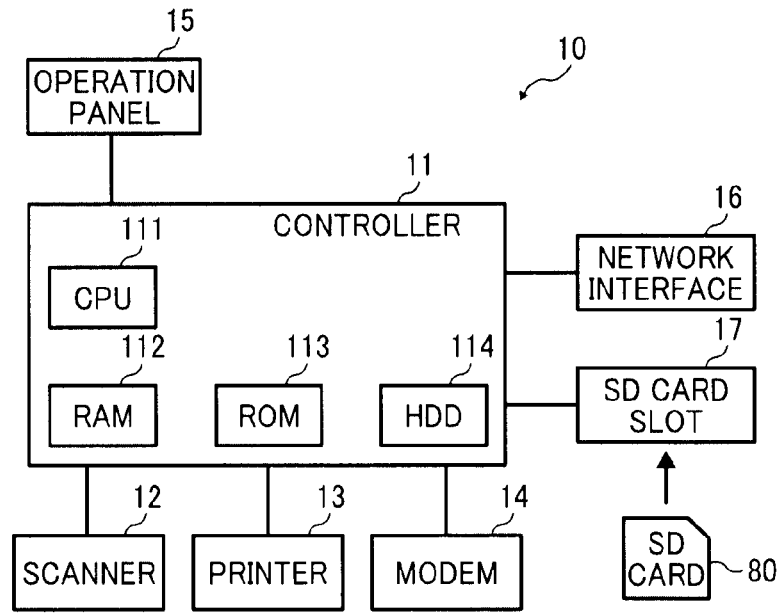
FIG. 3 illustrates an example hardware configuration of an image forming apparatus.

Next, hardware configurations of the various apparatuses and devices are described. FIG. 3 illustrates an exemplary hardware configuration of the image forming apparatus. Referring to FIG. 3, the image forming apparatus 10s includes hardware such as a controller 11, a scanner 12, a printer 13, a modem 14, an operations panel 15, a network interface 16, and an SD card slot 17.

The controller 11 includes a CPU 111, a RAM 112, a ROM 113, an HDD 114, and so on. Various programs and data used by the various programs are stored in the ROM 113. The RAM 112 is used as a memory area for loading the programs, a work area for the loaded programs, or the like. The CPU 111 performs various functions described in the disclosure by processing the programs loaded into the RAM 112. The HDD 114 records programs, various data used by the programs, or the like.

The scanner is hardware for reading image data from a manuscript. The printer 13 is hardware for printing the fax data on a print paper. The modem 14 is hardware for connecting the image forming apparatus 20 to a telecommunication line (not illustrated) and is used for sending and receiving the image data with fax communications. The operations panel 15 is hardware provided with an input unit for receiving an input from a user such as a button and a display unit such as a liquid crystal panel. The network interface 16 is hardware for connecting the image forming apparatus 20 to a wired or wireless network such as LAN. The SD card slot 17 is used to read a program recorded in the SD card 80. Otherwise stated, not only the programs stored in the ROM 113 but also the programs stored in the SD card 80 may be loaded into the RAM 112 and executed by the image forming apparatus 10.

Figure 4:
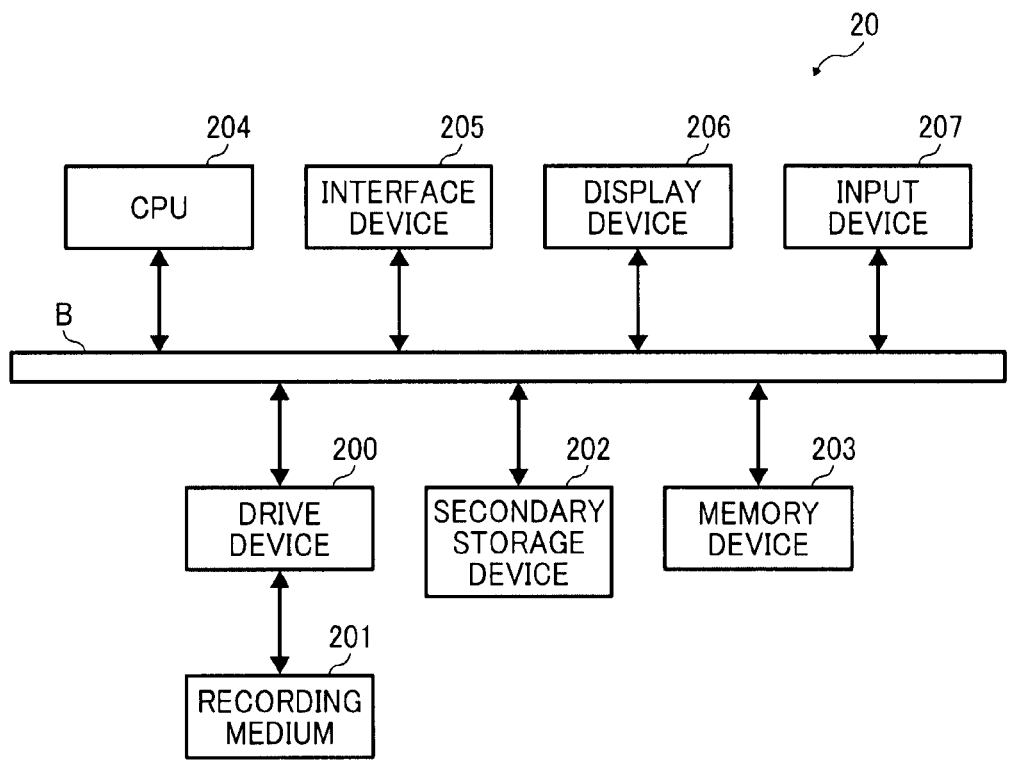
FIG. 4 illustrates a hardware configuration example of a user terminal.

FIG. 4 illustrates an exemplary hardware configuration of a user terminal. Referring to FIG. 4, the user terminal 20 includes a drive device 200, a secondary storage device 202, a memory device 203, a CPU 204, an interface device 205, a display unit 206, and an input unit 207, which are mutually connected by a bus B.

A program executed to perform various processes described by the user terminal 20a is supplied by a recording medium 201 such as CD-ROM. When the recording medium 201 with the program recorded on it is installed in the driving device 200, the program is installed in the secondary storage device 202 via the drive device 200. However, the program needs not to be always installed from the recording medium 201 and may be downloaded from another computer via the network. The secondary storage device 202 stores necessary files, data and so on in addition to the installed program.

The memory device 203 reads the program from the secondary storage device 202 when the program is instructed to be executed and stores the program in the memory device 203. The CPU 204 realizes various processes described herein in relation to the user terminal 20s in conformity with the program stored in the memory device 203. The interface device 205 is used as an interface for connecting to the network. The display device 206 displays a Graphical User Interface (GUI) or the like generated by the program. The input device 207 is configured to include a keyboard, a mouse or the like, and is used to input various operational instructions.

The widget, the widget manager 24s, and the provider application 124s are described in more detail below.

Figure 5:
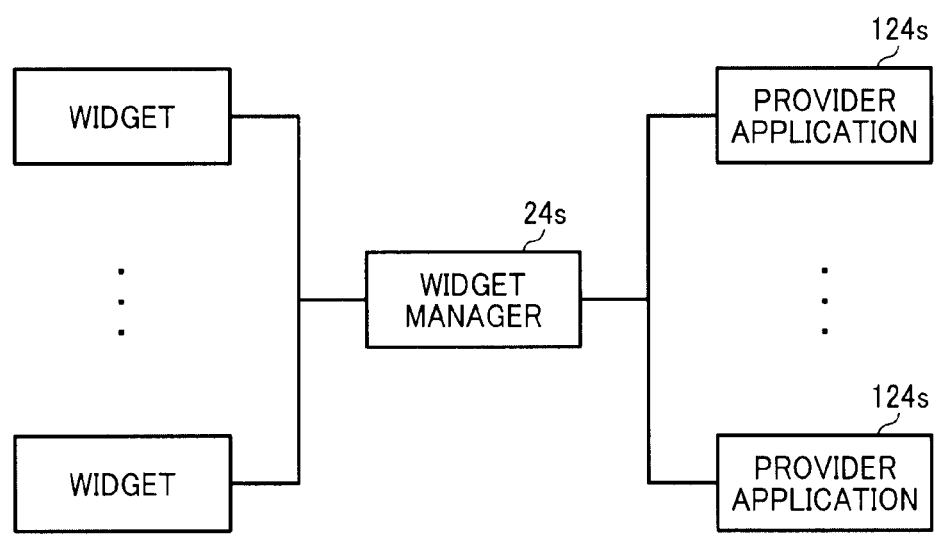
FIG. 5 illustrates an example relationship among widgets, a widget manager, and provider applications.

FIG. 5 illustrates an exemplary relationship among widgets, a widget manager, and provider applications. Referring to FIG. 5, jobs (for example, fax jobs) may be registered in the widget manager 24s by plural widgets (for example, the fax widget 23s). The jobs registered in the widget manager 24s may be acquired by plural provider applications 124s. The provider applications 124 correspond to the image forming apparatus 10s one-by-one. The jobs registered in the widget manager 24s may be executed by a plurality of image forming apparatuses 10s. When a print (fax) instruction is input into the user terminal 20s, it is not determined which image forming apparatus 10s actually executes the job (for example, sending faxes). The location of the image forming apparatus that actually sends the fax job can be freely determined.

Figure 6:
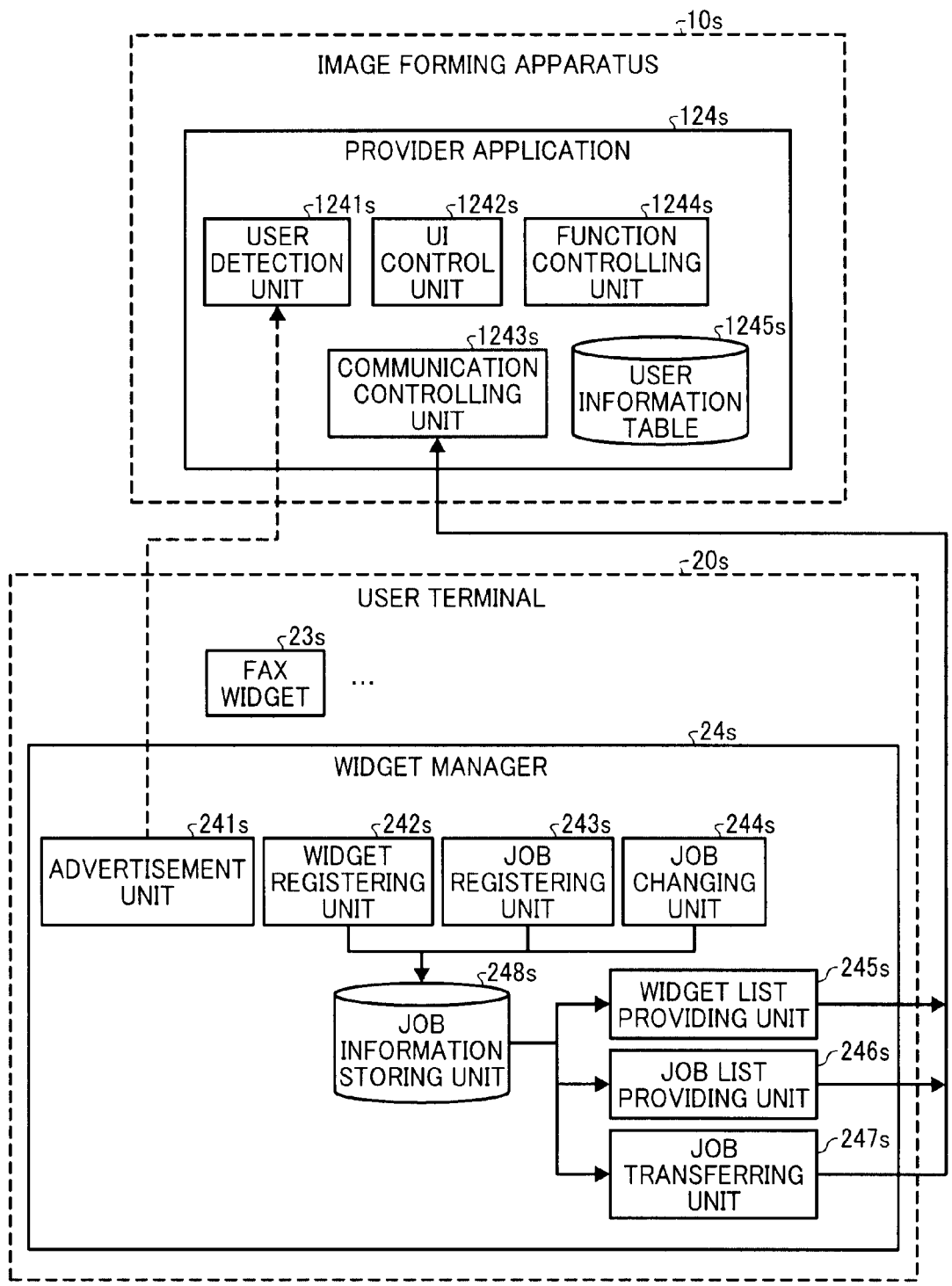
FIG. 6 illustrates example functional structures of the widget manager and the provider application.

FIG. 6 illustrates example functional structures of the widget manager and the provider application.

Referring to FIG. 6, the widget manager 24s includes an advertisement unit 241s, a widget registering unit 242s, a job registering unit 243s, a job changing unit 244s, a widget list providing unit 245s, a job list providing unit 246s, a job transferring unit 247s, and a job information storing unit 248s.

The advertisement unit 241s issues a broadcast or a multicast for reporting the existence of the widget manager 24s onto the network 40s when the widget manager is executed. This advertisement may be sent to unspecified or many destinations by the broadcast, the multicast or the like. Therefore, the broadcast may be received by the provider application 124 of the image forming apparatuses 10s, which await the receipt of such an advertisement. The widget manager may 24s exist individually for each user terminal 20s, and may be executed by each user terminal 20s. The widget manager 24s also may also individually correspond to a specific user. Therefore, the report of the existence of the widget manager 24s corresponds to a report of the existence of the user using the fax widget 23s. The advertisement includes an identifier (user ID) of a user who has logged in the user terminal 20s and has executed the widget manager 24s along with an identifier of the widget manager 24s. The widget manager 24s is handled as a resource on the network and the identifier of the widget manager 24s may be a uniform resource identifier (URI). The URI of the widget manager 24s is referred to as "WIDGET MANAGER URI".

The widget registering unit 242s receives a request to register a widget information piece sent from the executed fax widget 23s, and registers the widget information piece in the job information storing unit 248s. The widget information piece is attribute information corresponding to the fax widget 23s. For example, the widget information piece includes an identifier (widget ID) of the fax widget 23s, the name of the fax widget 23s, and so on. The widget manager 24s generates a uniform resource identifier (URI) as an identifier of the registered fax widget 23s. The URI (hereinafter, referred to as "widget URI") is assigned to the fax widget 23s in response to the request to register the widget information piece.

The job registering unit 243s records or registers a fax sending job into the job information storing unit 248s in response to a request to register the fax sending job from the fax widget 23s registered in the job information storing unit 248s. The fax sending job information is information constituting the fax sending job, and includes the fax setting information and the fax data, for example. The fax setting information is an attribute related to a fax sending job (for example, user ID or job name). The widget manager 24s generates the URI as the identifier of the registered fax sending job, and returns the URI (hereinafter, referred to as fax sending job URI) to the fax widget 23s as a response to the registering request.

The job changing unit 244s changes the fax sending job information corresponding to the fax sending job URI designated in a changing request in response to a request to change the already registered fax sending job. The user may change fax setting information, the fax data and so on corresponding to the fax sending job held by the widget manager 24s after a print (fax) instruction.

Figure 7:
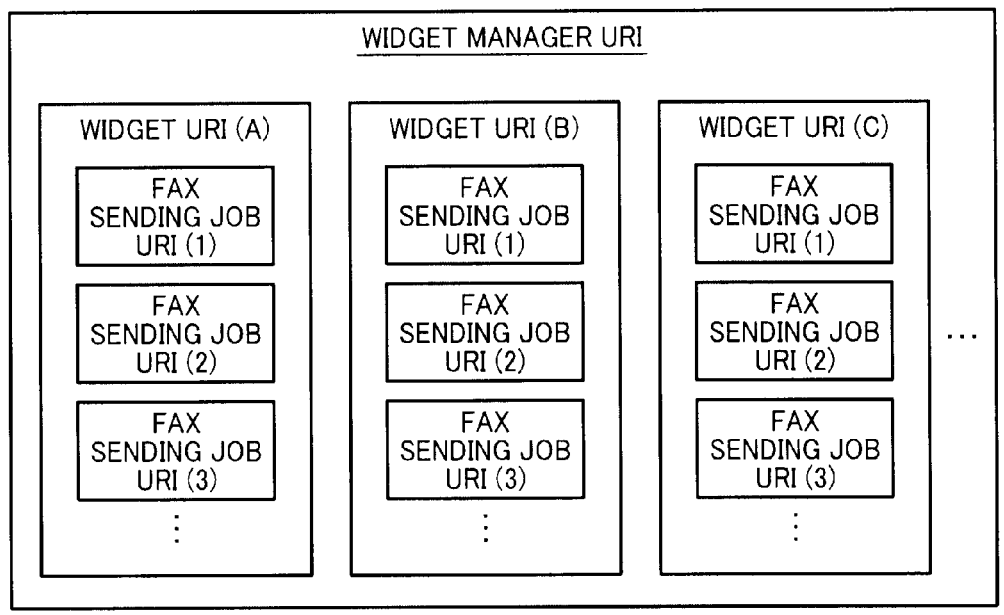
FIG. 7 illustrates a relationship of between a plurality of URIs according to the first embodiment.

Next, a relationship among the above URIs is described. FIG. 7 illustrates a relationship of between each of the URIs according to the first embodiment. Referring to FIG. 7, a relationship among squares illustrates the hierarchy of the URIs. When one of the squares encloses another of the squares, the enclosing square is of a higher hierarchy than that of the enclosed square. FIG. 7 illustrates the enclosure relationship or the hierarchy relationship among the resources or information identified by the URI.

As illustrated in FIG. 7, one or more fax widget(s) is/are registered in the widget manager identified by one widget manager URI, and the widget URIs are given to corresponding fax widgets 23a. The widget URI indicates a position of a resource as a management space for information (widget information piece, fax sending job information or the like) related to the fax widget 23s corresponding to the widget URI. The widget information piece, the fax sending job information, and so on of the fax widget 23s are registered in the management space indicated by the widget URI given to the fax widget 23s. One fax widget 23s may register plural fax sending job information pieces in the widget manager 24s. The fax sending job information registered in the widget manager 24s is managed as a resource on the network and fax sending job URIs are allocated to corresponding fax sending job information pieces.

Referring to FIG. 7, three fax widgets 23a are registered into the widget manager 24s, and the fax widgets 23a each register three fax sending job information pieces into the widget manager 24s. Therefore, three widget URIs are generated under the widget manager URI, and three fax sending job URIs are generated under the widget URIs.

As described above, by managing the resources in association with the URIs, a component which operates the resources such as the fax widget 23s or the provider application 124s via the network may access various resources with a general-purpose WebAPI using an HTTP command.

FIG. 8 illustrates example contents of each of the URIs according to the first embodiment. More specifically, FIG. 8 illustrates specific examples of the URIs illustrated in FIG. 7.

A description 401 is an example of the widget manager URI. The path name of the widget manager URI is "widgets". In FIG. 8, <ADDRESS> designates an IP address of the user terminal 20s, and <PORT NUMBER> designates a port number of the widget manager 24s.

Descriptions 410, 420, and 430 are specific examples of the widget URI of the different fax widgets 23a. The path name of the widget URI is "widgets/<WIDGET ID>". Thus, the path name is formed by adding the widget ID of the fax widget 23s to the path name of the widget manager URI.

The descriptions 411 to 413 correspond to three fax sending job information pieces registered by the fax widget 23s corresponding to the widget URI related to the description 410. The path name of the fax sending job URI is "widgets/<WIDGET ID>/jobs/<JOB ID>". Thus, the path name of the fax sending job URI is formed by adding the job ID of the fax sending job to the path name of the widget URI. The job ID is allocated or selected by the widget manager 24s when the fax sending job information is registered into the widget manager 24s. Similarly, the descriptions 421 to 423 correspond to three fax sending job information pieces registered by the fax widget 23s corresponding to the widget URI related to the description 420. The descriptions 431 to 433 correspond to three fax sending job information pieces registered by the fax widget 23s corresponding to the widget URI related to the description 430.

Referring back to FIG. 6, the widget list providing unit 245s returns a list of the fax widget 23s registered in the job information storing unit 248s in response to a request by the provider application 124. The list information includes the widget URIs for each fax widget 23s.

The job list providing unit 246s returns the list of the fax sending jobs registered by the fax widget 23s related to the widget URI, which is designated by a request to acquire the list information of the fax sending jobs from the provider application 124 in response to the acquiring request. The list information to be returned includes fax sending job URIs for each fax sending job.

The job transferring unit 247s returns the fax sending job information of the fax sending job related to the fax sending job URI designated by the acquiring request in response to the acquiring request of the fax sending job from the provider application 124. The provider application 124, which has received the fax sending job, causes the image forming apparatus 10s to carry out the fax sending job based on the fax sending job information.

Meanwhile, the provider application 124s includes a user detection unit 1241s, a UI control unit 1242s, a communication controlling unit 1243s, a function controlling unit 1244s, a user information table 1245s, and so on.

The user detection unit 1241s detects the existence of a user who can use the fax widget 23s based on the receipt of the advertisement issued by the widget manager 24s and registers the user ID and so on included in the advertisement into the user information table 1245s. The UI control unit 1242s controls the display of various screens for inputting operation instructions related to the provider application 124s. The communication controlling unit 1243s sends a request to acquire the widget list information, a request to acquire the list of the fax sending job, a request to acquire the fax sending job, or the like to the widget manager 24s, and receives a response for the request. The function controlling unit 1244s controls a function requested to the image forming apparatus 10s with the fax widget 23s subject to use. The user information table 1245s includes widget manager URIs of the widget managers 24s executed in the user terminals 20s, the user IDs of the user terminals 20s, and so on stored in a memory device such as HDD 114 of the image forming apparatus 10s.

Communications between the fax widget 23s and the widget manager 24s and between the widget manager 24s and the provider application 124s are carried out by hypertext transfer protocol (HTTP). However, any other suitable communication protocol may be used.

Figure 9:
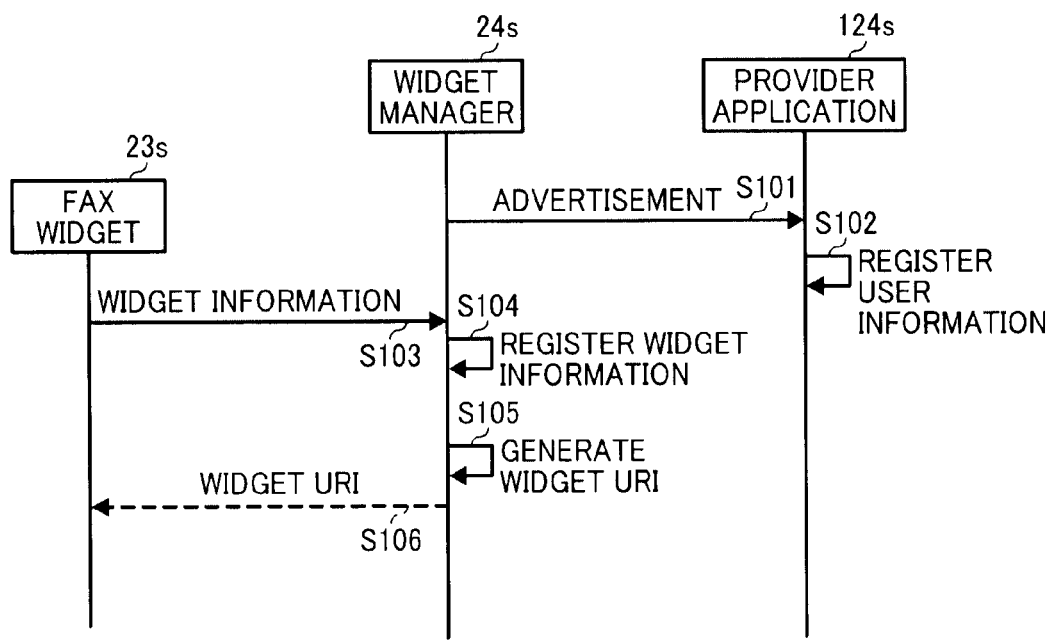
FIG. 9 is a sequence diagram showing a process performed when executing the widget manager and the fax widget according to a first embodiment.

Hereinafter, a procedure of the facsimile communication system 1 of according to the first embodiment is described. FIG. 9 is a sequence diagram showing a process performed when executing the widget manager and the fax widget according to a first embodiment.

When the widget manager 24s is executed upon a user's instruction or automatically executed at the user terminal 20s in fax sending environment S, the advertisement unit 241s of the widget manager 24s issues the advertisement of the user information including the user ID of the login user and the widget manager URI into the network 40s in step S101.

Thereafter, when the communication controlling unit 1243s of the provider application 124s receives the advertisement, the communication controlling unit 1243s registers the user information included in the advertisement into the user information table 1245s in step S102.

FIG. 10 illustrates an example of the user information table. Referring to FIG. 10, one record of the user information table 1245s corresponds to one user information item. Every record is formed by items such as a user ID and a widget manager URI. Values received in step S102 are directly recorded in the user information table.

Thereafter, the fax widget 23s is activated in the user terminal 20s. The fax widget 23s reads the widget information piece from a setup file and sends a request to register the widget information piece to the widget manager URI in step S103. The widget manager URI is recorded in a memory region such as a setup file of the fax widget 23s, which can be accessed by the fax widget 23s.

FIG. 11 illustrates an example of the widget information piece of the fax widget according to the first embodiment. The widget information piece of the fax widget 23s includes a widget ID, a widget name, a coordination function identifier, a display name, and so on.

The widget ID includes information to uniquely identify the fax widgets 23s. The widget name is a name of the widget. The coordination function identifier is information for recognizing a function used by the fax widget 23s that is performed by the image forming apparatus 10s coordinating with the fax widget 23s. One example of the coordination function identifier is "print", "scan" or the like. The print function is indicated by "print", and the scan function is indicated by "scan".

As described previously, the print application 122a receives fax data, and determines whether received data is fax data or not. In other words, an image forming apparatus 10s receives data without distinction between fax data and print data. Therefore, the fax widget 23s uses the print function of the image forming apparatus 10s. The entry "print" is a coordination function identifier in the example illustrated in FIG. 11. The display name is a character string for displaying the fax widget 23s.

The widget registering unit 242s of the widget manager 24s registers the widget information piece into the job information storing unit 248s in response to a request to register the widget information piece in step S104. Then, the widget registering unit 242s generates a URI corresponding to the recorded widget information piece in step S105. The URI is the widget URI. The widget URI may be generated and allocated as "WIDGET MANAGER URI/<WIDGET ID>". The widget information pieces and the widget URI are mutually associated and managed by the widget manager 24s. Thereafter, the widget registering unit 242s returns a response including the generated widget URI to the fax widget 23s in step S106. The widget ID of the fax widget is indicated "94d5dd11" shown in FIG. 11. For example, the widget URI is allocated as "http://192.168.XXX.XXX/widgets/94d5dd11". The fax widget 23s stores the received widget URI using the memory device 203.

After the above processes are completed, the fax sending job may be registered in the widget manager 24s.

Figures 12, 13:
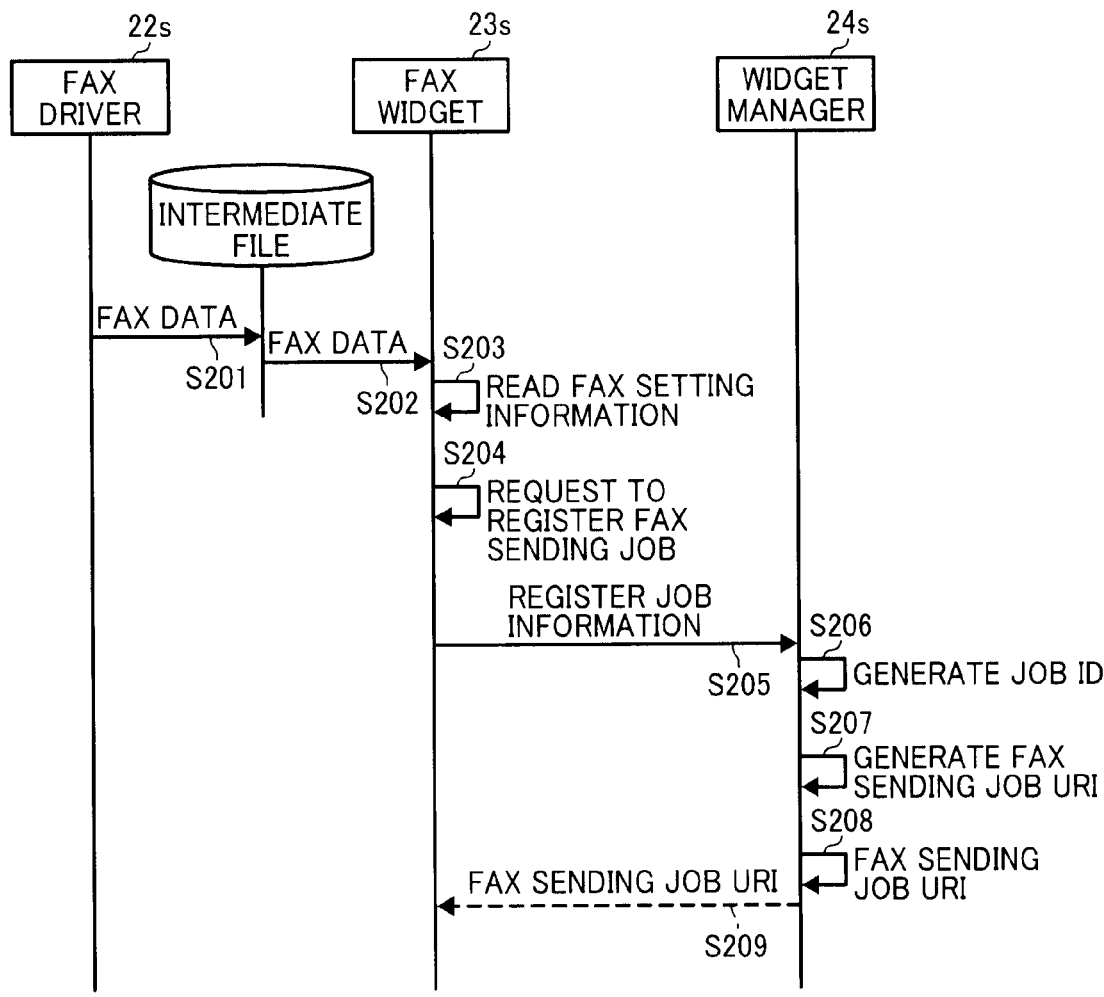
FIG. 12 is a sequence diagram showing a process performed when registering the fax sending job into the widget manager according to the first embodiment.
FIG. 13 illustrates a structural example of the fax setting information according to the first embodiment.

FIG. 12 is a sequence diagram showing a process performed when registering the fax sending job into the widget manager according to the first embodiment.

When print (fax) instruction related to the fax driver is input into the user terminal 20s by the user who operates the document application 21, the fax driver 22s generates fax data related to the document edited in the document application 21s. When the logical fax corresponding to the fax widget 23s is designated a destination of print, the fax driver 22s generates an intermediate file having a predetermined file name as an output destination for the logical fax in step S201.

Meanwhile, the fax widget 23s waits for the generation of the intermediate file after the fax widget 23s is activated. Specifically, the fax widget 23s performs polling to confirm whether the intermediate file exists. When the fax widget 23s detects the intermediate file generated, the fax widget 23s reads fax data from the intermediate file in step S202.

Thereafter, the fax widget 23s reads the fax setting information from a setup file in step S203. Then, the fax widget 23s adds (stores) a fax number and F-code included the fax setting information to the fax job in step S204.

Then, the fax widget 23s sends a request to register the fax sending job including the fax setting information and fax data into the "WIDGET URI/jobs" in step S205. The destination of requesting registration of the fax sending job is formed by adding "/jobs" to the path name of the widget URI. This naming rule may be commonly recognized between the widget manager 24s and the fax widgets 23a.

FIG. 13 illustrates an example of the fax setting information according to the first embodiment. The fax setting information shown in FIG. 13 includes a user ID, a job name, fax data and so on.

The user ID is information identifying a user requesting a job. The job name is a name of the job. For example, a name of the document data to be send fax automatically becomes the job name. The fax data is described previously. As shown in FIG. 13, the fax setting information does not include the fax number and the F-code, because the fax number and the F-code are already included in the fax data.

In response to the request to register the fax sending job, the job registering unit 243s records the received fax sending job information into the job information storing unit 248s in step S206. Thereafter, the job registering unit 243s generates the job ID corresponding to the fax sending job related to the registered fax sending job information in step S207. Thereafter, the job registering unit 243s adds a job ID to the URI designated as the destination for requesting registration of the job information to generate the fax sending job URI in step S208. The fax sending job information and the fax sending job URI are associated each other and managed by the widget manager 24s.

Thereafter, the widget registering unit 243s returns a response including the generated fax sending job URI to the fax widget 23s in step S209. For example, if "67ae2c2" is allocated as the job ID, the widget registering unit 243a returns "http://192.168.XXX.XXX/widgets/9415d11/jobs/67ae2c2" as the fax sending job URI. The fax widget 23s stores the received fax sending job URI using the memory device 203s.

The processes of FIG. 12 are carried out for each input of print (fax) instructions. As a result, as illustrated in FIG. 7, plural fax sending job information pieces for plural fax widgets 23s may be registered or accumulated in the widget manager 24s.

When document files to be sent as faxes (files storing the document data) are directly dragged and dropped onto an icon displayed by the fax widget 23s, the fax sending job information is registered into the widget manager 24s. Specifically, the fax widget 23s activates the document application 21s corresponding to the document file with a command line in which the file name of the dragged and dropped document file is designated as an argument, and a print process in which the logical fax corresponding to the fax widget 23s is carried out by the document application 21s. As a result, in a manner similar to step S201 of FIG. 12, the fax data for the document data is generated by the fax driver 22s, and the fax data are output to an intermediate file and set up as the output destination of the logical fax. Thereafter, steps S202 to S210 are carried out. The document application 21s activated by the command line automatically ends. The document application 21s corresponding to the document file may be determined based on a table indicating a relationship between an extension of the document file and the document application 21s. The table may be maintained by the fax widget 23s or stored in the memory device used by the user terminals in common. When the document file dragged and dropped has a file form which can be used to directly send faxes, the processes on and after step S203 may be carried out without activating the document application 21s with the command line.

When plural image forming apparatuses 10s are connected to the network 40s, the same advertisement is received by the user detection unit 1241s in the image forming apparatuses 10, and the user ID and the widget manager URI are registered in the user information tables 1235s of the image forming apparatuses 10. Therefore, the user can carry out the fax sending jobs in any of the plural image forming apparatuses 10s.

Figure 14:
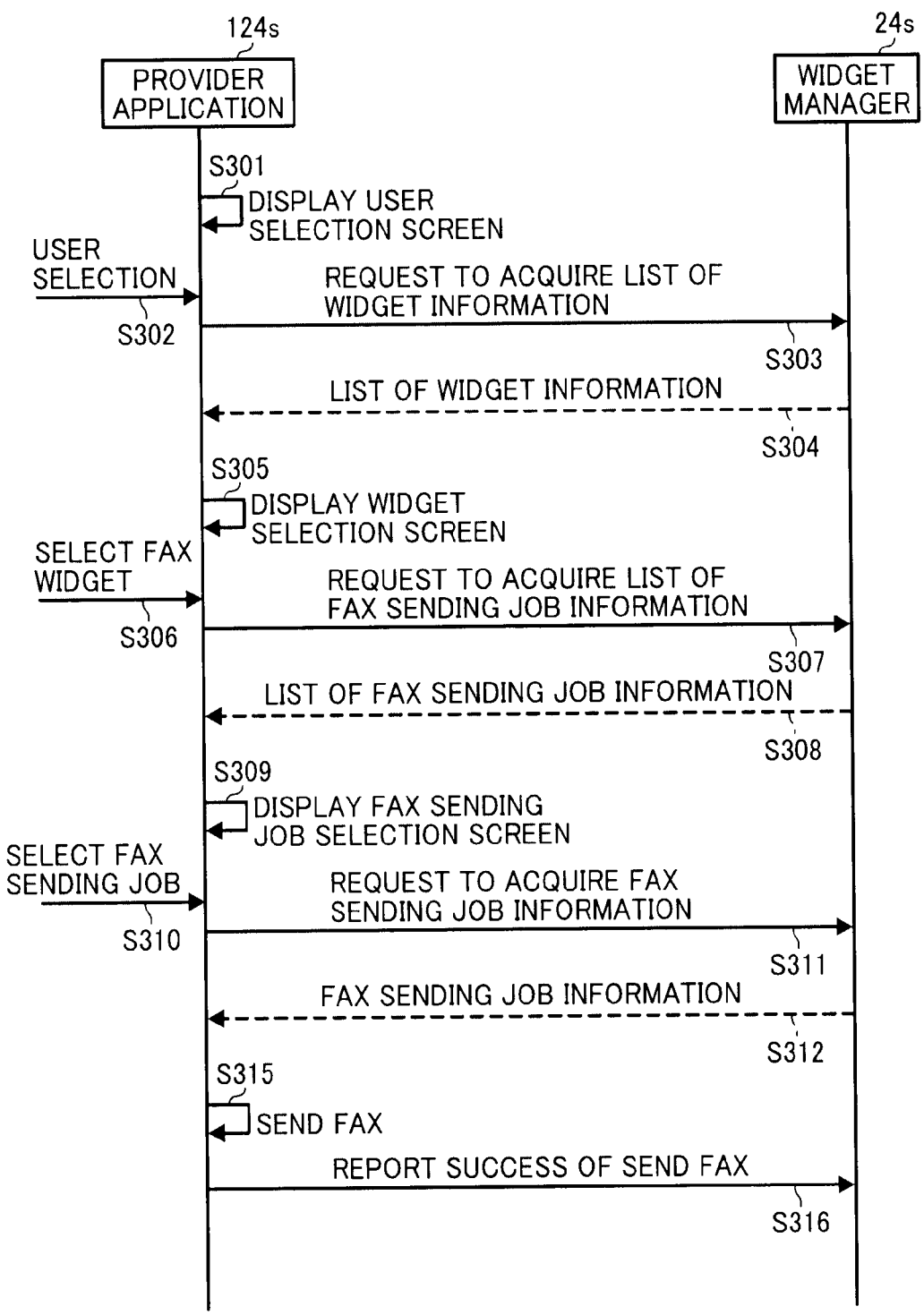
FIG. 14 is an exemplary sequence diagram showing procedures performed when carrying sending a fax.

FIG. 14 is an exemplary flowchart showing a process performed when carrying out a fax sending job. The user moves to a location of the image forming apparatus 10s to carry out the registered fax sending job.

When an instruction to use the provider application 124s via the operations panel 15 on the image forming apparatus 10s is input by a user, the application control unit 130 activates the provider application 124s. The UI control unit 1242s of the provider application 124s detects that the provider application 124s is the active application 120. Then, the UI control unit 1242s displays a user selection screen on the operation panel 15s based on the information registered in the user information table 1245s in step S301. The user selection screen displays display components such as a button enabling the selection of each user ID registered in the user information table 1245s.

Thereafter, the user selects a button corresponding to the user ID on the user selection screen in step S302. The communication controlling unit 1243s acquires the widget manager URI associated with the user ID corresponding to the selected button from the user information table 1245s. Thereafter, the communication controlling unit 1243s sends a request to acquire a list of the widget information to the widget manager URI in step S303. The request to acquire the list of widget information is received by the widget list providing unit 245s of the widget manager 24s corresponding to the widget manager URI. The widget list providing unit 245s returns the list of widget information including all the widget information pieces and the widget URI associated with each the widget information pieces to the provider application 124s in step S304.

Thereafter, the UI control unit 1242s of the provider application 124s records the received list of widget information pieces in the RAM 112, and displays a widget selection screen page including the list of the widgets usable by the user on the operations panel 15 in step S305. Display components such as a button are displayed for each widget on the widget selection screen page. For example, display names of the widgets are displayed on the display components.

When a button corresponding to any of the fax widgets 23s is selected on the widget selection screen page in step S306, the communication controlling unit 1243s recognizes that the print (fax) is carried out based on the coordination function identifier "print" included in the widget information piece (hereinafter, referred to as "current widget information piece") corresponding to the selected button. Therefore, the communication controlling unit 1243s sends a request to acquire the list of the fax sending job to the widget URI associated with the current widget information piece in step S307.

The request to acquire the list of the fax sending job to the widget URI is received by the job list providing unit 246s of the widget manager 24s related to the widget URI. The job list providing unit 246s returns the list of the fax sending job URI having the path name on and after "<the WIDGET URI>/jobs" to the provider application 124s in step S308.

Thereafter, the UI control unit 1242s of the provider application 124s records the received list of the fax sending job URI in the RAM 112, and displays a fax sending job selection screen page displaying a list of the registered fax sending jobs in the operations panel 15 based on the list in step S309. Display components such as a button are displayed for each fax sending job on the fax sending job selection screen.

When the button corresponding to any of the fax sending job URIs is selected on the widget selection screen page in step S310, the communication controlling unit 1243s sends a request to acquire the fax sending job information to the fax sending job URI corresponding to the selected button in step S311.

The request to acquire the fax sending job to the fax sending job URI is received by the job transferring unit 247s of the widget manager 24s related to the fax sending job URI. The job transferring unit 247s acquires fax setting information and fax data from the job information storing unit 248s (The fax setting information is associated with the fax sending job URI. The fax data is associated with the fax data URI of "<the FAX SENDING JOB URI/file/>"), and returns the fax sending job information including the fax setting information and the fax data to the provider application 124s is step S312.

The communication controlling unit 1243s of the provider application 124s inputs the received fax sending job information to the function controlling unit 1244s. The function controlling unit 1244s causes the image forming apparatus 10s to carry out the fax sending job based on the fax setting information and the fax data in step S315.

Specifically, the function controlling unit 1244s sends the fax data to the printer port corresponding to the print application 122s via an internal communication in the image forming apparatus 10s. The print application 122s receives the fax data, and determines that the data is not print data by referencing a part of the fax data, and inputs the fax data to the fax application 123s. The fax application 123s sends image data included in the fax data to a fax number and an F-code specified in the fax setting information using the modem 14.

After the fax sending job is completed, the communication controlling unit 1243s sends a success report indicating that the fax sending job has been successfully carried out to the widget manager 24s in step S316.

The sent image data is received by the fax application 123r in the image forming apparatus 10r corresponding to the specified fax number in the fax receiving environment R. The fax application 123r determines a distribution address to distribute the received image data based on the specified F-code. For example, if the F-code is related in a folder in the user terminal 20r or the document management server 30, the fax application 123r stores the image data in the folder. Or, if the F-code is related in a e-mail address, the fax application 123r delivers the image data to the e-mail address. The related information between an F-code and a distribution address is stored in the HDD 114r in the image forming apparatus 10r.

According to the first embodiment, an F-code is automatically added into the fax data by the fax widget 23s. Therefore, it is possible to decrease a burden to specify an F-code. If a certain user in the fax sending environment S has plural business partners, plural fax widgets corresponding to each of the plural business partners are installed into the user terminal 20r, and a specific fax number or F-code may be included in the fax setting information of each widget.

The fax widget 23s may be distributed by someone in the fax receiving environment R. In this case, each business partner in the fax receiving environment R can specify an appropriate fax number and f-code in the fax setting information for his or her corresponding fax widget 23s. Then, the business partner can send the fax widget 23s to the business partner. It is possible to easily construct a fax sending environment that a fax widget 23s, a fax driver 22s and a widget manager 24s are archived into an archive file.

[Second Embodiment]

In the second embodiment, a barcode is used instead of an F-code. Specifically, a process performed for a fax image in the fax receiving environment (hereinafter, "workflow") is determined based on the barcode on the fax image. Otherwise stated, the barcode is recorded information used to determine the workflow (hereinafter, "workflow information").

Therefore, fax setting information of the fax widget 23s in the user terminal 20s in the fax sending environment includes the workflow information instead of the F-code. For example, the workflow information may be a folder name or an e-mail address to distribute a fax image, or information to print a fax image in the fax receiving environment.

Figure 15:
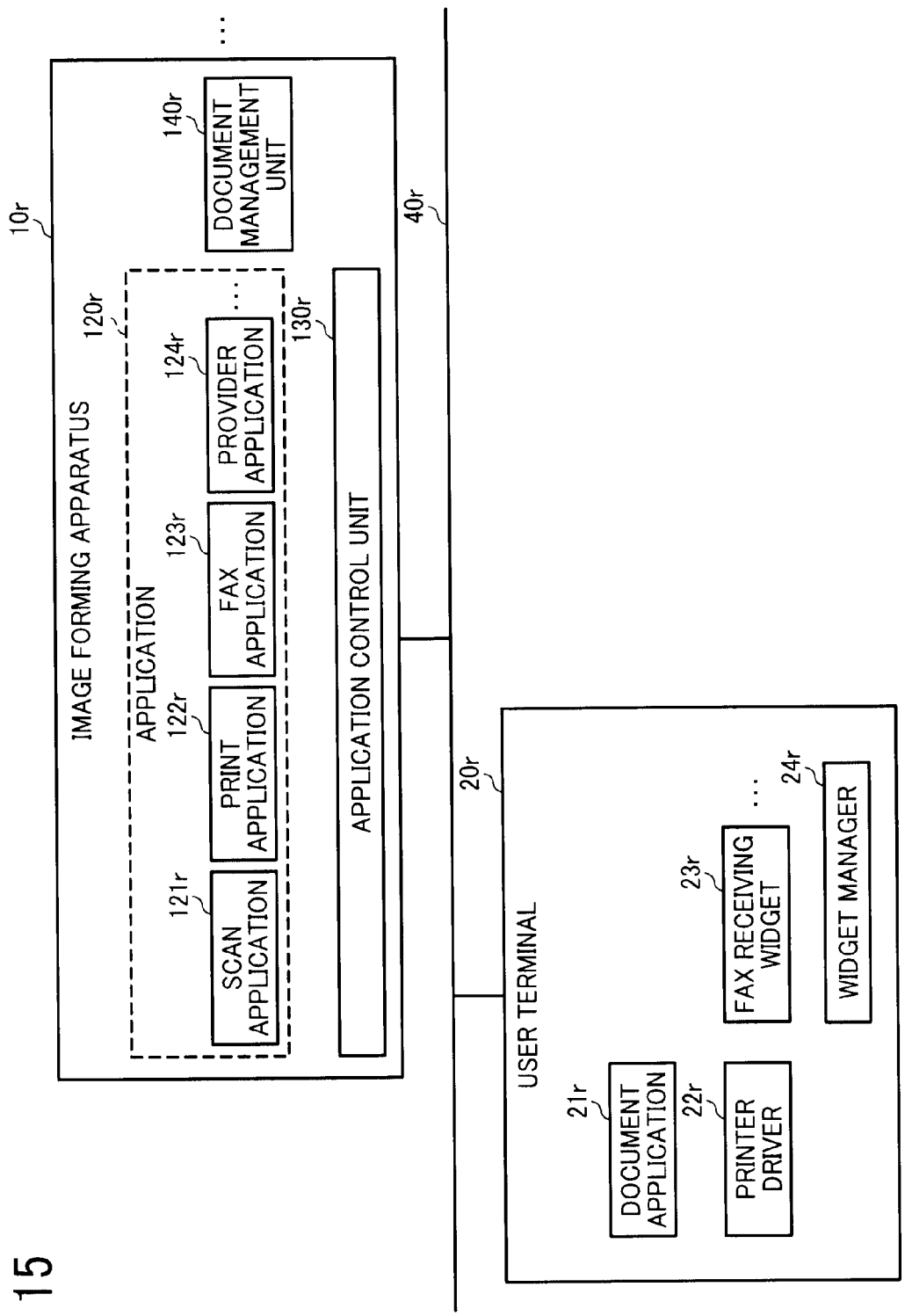
FIG. 15 illustrates a software configuration of each of the apparatuses in the fax sending environment according to the second embodiment.

FIG. 15 illustrates a software configuration of each apparatuses in the fax sending environment according to the second embodiment.

The image forming apparatus 10r additionally includes a document management unit 140r. The document management unit 140r stores a fax image received by the fax application 123r into the HDD 114r.

The user terminal 20r includes one or more document applications 21r, a print driver 22r, a fax receiving widget 23r, a widget manager 24r, or the like. The document applications 21r and the widget manager 24r are similar software configurations with the document applications 21s and the widget manager 24s shown in FIG. 1.

The document application 21 includes an application for producing document data to be printed, such as word processor software and/or spreadsheet software. The printer driver 22 converts document data to print data which can be comprehended by the image forming apparatus 10 such as a Page Description Language (PDL) data, a Portable Document Format (PDF) data, and a Tagged Image File Format (TIFF). The print driver 22r is set up to output generated print data as a file having a predetermined file name without outputting the generated print data to the printer port.

The fax receiving widget 23r monitors an image forming apparatus to determine whether a fax image is received. When the fax receiving widget 23r detects that a fax image has been received, the fax receiving widget 23r determines a workflow based on a barcode on the fax image to perform the workflow for the fax image.

Hereinafter, the procedure of the facsimile communication system 1 of according to the second embodiment is described.

At first, the procedure of the fax sending environment S is described. In the second embodiment, a processing procedure shown in FIG. 16 is performed instead of FIG. 12.

FIG. 16 is a sequence diagram showing a process performed when registering the fax sending job into the widget manager according to the second embodiment.

The processing procedure in steps S351-353 is similar to steps S201-203 shown in FIG. 12, thus a detailed description of these steps is omitted. Next, the fax widget 23s generates a barcode image corresponding to workflow information included in the fax setting information in step S354. A matrix barcode (or two-dimensional code) such as QR code may be adopted instead of the barcode. The fax widget 23s merges the barcode image to a prescribed position of an image data printed as a letterhead (hereinafter, "letterhead image") in step S355. The letterhead image may be generated by the fax widget 23s or be stored in the HDD 144s. In this context, the letterhead may be a printed bibliographic index, and indicate information such as a sender or a fax number.

The fax widget 23s adds the letterhead image merged with the barcode image into the fax data (for example, TIFF data) as first page in step S356.

A processing procedure after the step S357 performs a similar process as after step S201 shown in FIG. 12. As a result, a fax sending job information piece corresponding to the fax data included the letterhead image merged with the barcode image is registered to the widget manager 24s. The fax data including the letterhead image merged with the barcode image is sent to the fax receiving environment R, after performing a process similar to that shown in FIG. 14.

Next, a procedure performed at the fax receiving environment R is described. FIG. 17 is a sequence diagram showing a process performed when receiving a fax image according to the second embodiment.

The fax receiving widget 23r monitors the image forming apparatus to determine whether a fax image is received, when the fax receiving widget 23r is activated in the user terminal 20r in the fax receiving environment R. Specifically, the fax receiving widget 23r polls the document management unit 140r in the image forming apparatus 10r to confirm whether fax image has been received in step S401. The document management unit 140r returns a response indicating that there is no fax image in step S402 when no fax images have been received. Identifiers for one or more of the image forming apparatuses 10r (for example, IP address) may be designated in a setup file of the fax receiving widget 23r in advance.

Meanwhile, the fax application 123r receives a fax image in step S403, and registers the received fax image to the document management unit 140r in step S403. The document management unit 140r manages the registered fax image associated with a certain URI (hereinafter, "fax image URI").

If the document management unit 140r received the request to confirm fax image from the widget manager 23r after registering the fax image (S405), the document management unit 140r returns the fax image URI associated with fax image in step S406. The fax receiving widget 23r sends a request to acquire the fax image specifying the fax URI to the document management unit 140r in step 407. The document management unit 140r returns the fax image associated with the specified fax URI to the fax receiving widget 23r in step S408.

In step S409 the fax receiving widget 23r analyzes the barcode in a prescribed position of the first page of the image data (that is to say, in the letterhead image). Then, the fax receiving widget 23r deletes the barcode in the letterhead image in step S410. The barcode is insignificant for a user, since the barcode is automatically merged by the fax widget 23s.

The fax receiving widget 23r performs a workflow operation based on the workflow information from the barcode analyzed in step S409. For example, if the workflow information indicates that the fax image is to be stored in the document management server 30 or the user terminal 20r, the fax receiving widget 23r stores the fax image into the folder corresponding to the folder name specified in the workflow information. If the workflow information indicates that the fax image is to be sent by e-mail, the fax receiving widget 23r sends the fax image to the e-mail address specified in the workflow information. If the workflow information indicates that the fax image is to be printer, the fax receiving widget 23r registers the fax image as a print job to the widget manager 24r performing the process shown in FIG. 19.

A process similar to that shown in FIG. 9 is performed when activating each the widget manager 24r and the fax receiving widget 23r before the print job is registered at the widget manger. For example, the fax receiving widget 23r registers a widget information piece shown in FIG. 18 to the widget manager 24r.

FIG. 18 illustrates an example of the widget information piece of the fax receiving widget according to the second embodiment. As shown in FIG. 18, the items of the widget information piece for the fax receiving widget are similar to the fax widget described in the first embodiment. A coordination function identifier for the fax receiving widget is "print", because the fax receiving widget can cause the image forming apparatus 10r to carry out a print job.

The widget manager 24r generates a widget URI for the fax receiving widget 23r (hereinafter, "fax receiving widget URI") in response to registration of the widget information for the fax receiving widget 23r. The widget information pieces and the fax receiving widget URI are mutually associated and managed by the widget manager 24r. The fax receiving widget URI is returned to the fax receiving widget as a response to registration of the widget information.

FIG. 19 is a flowchart showing a process performed when registering the print job of fax image into the widget manager according to the second embodiment.

The fax receiving widget 23r activates the document application 21s corresponding to the fax image with a command line in which the file name of the fax image is designated as an argument, and a print process is carried out by the document application 21s. In this manner, the fax receiving widget transmits the received fax image to the print driver 22r in step S451. As a result, the print data for the fax image is generated by the print driver 22r in step S452. The logical printer corresponding to the fax receiving widget 23r may be designated a destination of print. Then, the print driver 22r generates an intermediate file as an output destination for the logical printer.

Meanwhile, the fax receiving widget 23r waits for the generation of the intermediate file. Specifically, the fax receiving widget 23r performs polling to confirm whether the intermediate file exists. When the fax receiving widget 23s detects that the intermediate file is generated, the fax receiving widget 23s reads print data form the intermediate file in step S453. When the fax image can be directly printed, the processes shown in steps S451-453 may be not carried out, and the fax image may become print data.

The fax receiving widget 23r reads the print setting information from a setup file in step S454. Then, the fax receiving widget 23r sends a request to register the print job including the print setting information and print data into the "WIDGET URI/jobs" in step S455.

FIG. 20 illustrates an example of the print job information according to the second embodiment. The print job information shown in FIG. 20 includes a user ID, a job name, fax data and so on.

The user ID is information identifying a user requesting a job. The job name is a name of the job. For example, a name of the fax image be printed automatically becomes the job name. The print job information includes the print data.

In response to the request to register the fax sending job, the job registering unit 243r of the widget manager 24r records the received print job information into the job information storing unit 248r in step S456. Thereafter, the job registering unit 243r generates the job ID corresponding to the print job related to the registered print job information in step S457. Thereafter, the job registering unit 243r adds a job ID to the URI designated as the destination of requesting to register the job information to thereby generate the print job URI in step S458. The fax sending job information and the fax sending job URI are associated with each other and are managed by the widget manager 24r.

Thereafter, the widget registering unit 243r returns a response including the generated print job URI to the fax receiving widget 23r in step S459.

Thereafter, the widget registering unit 243r returns a response including the generated print job URI to the fax receiving widget 23r in step S459. The fax receiving widget 23s stores the received print job URI using the memory device 203r.

The user moves to a location of the image forming apparatus 10r to carry out the registered print job after registering the print job. When plural image forming apparatuses 10r are connected to the network 40r, the same advertisement is received by the user detection unit 1241r in the image forming apparatuses 10, and the user ID and the widget manager URI are registered in the user information tables 1235r of the image forming apparatuses 10. Therefore, the user can carry out the print jobs in any of the plural image forming apparatuses 10r.

Figure 21:
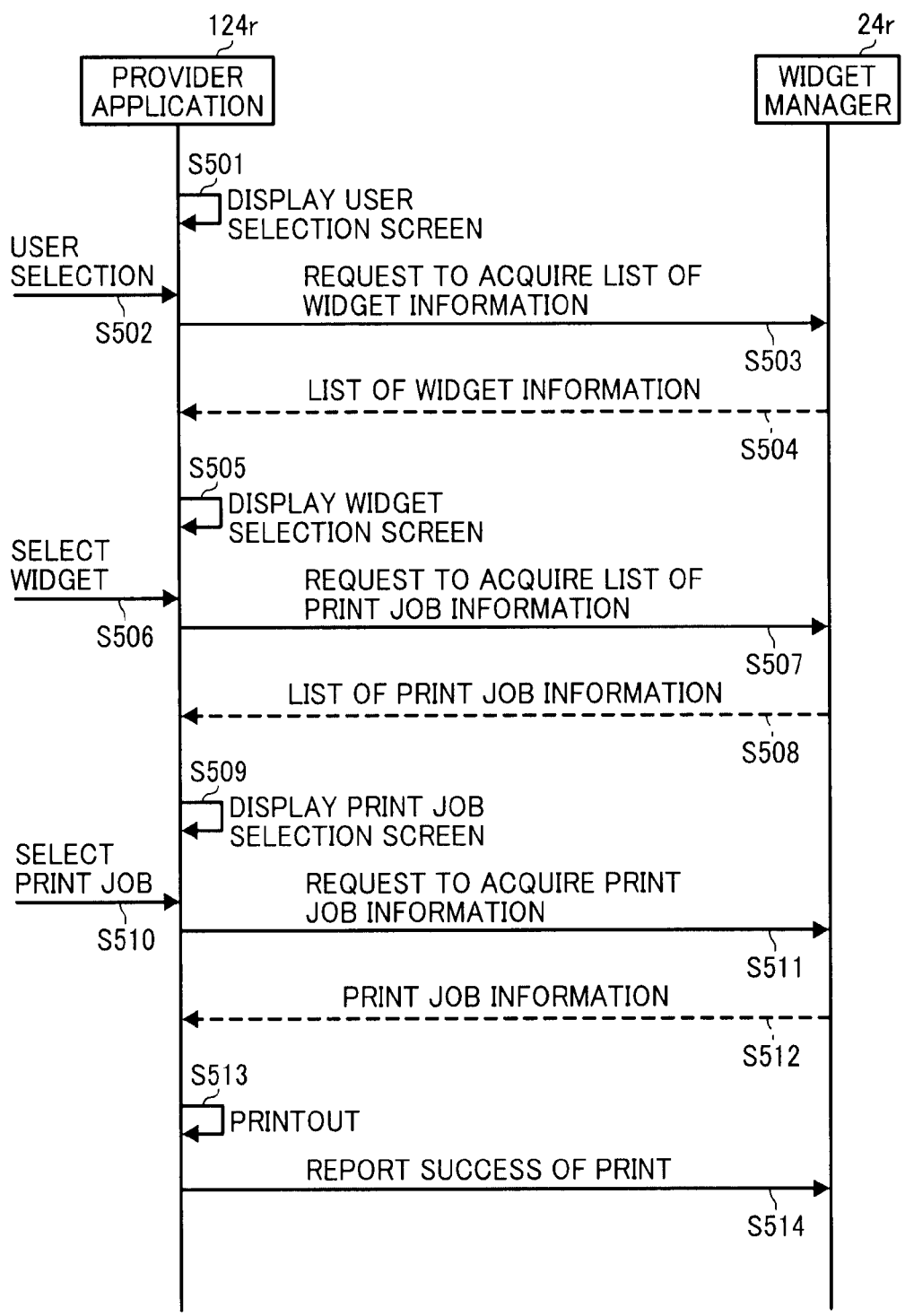
FIG. 21 is a sequence diagram showing a process performed when carrying out the print job corresponding to the fax image according to the second embodiment.

FIG. 21 is a flowchart showing a process performed when carrying out the print job corresponding to the fax image according to the second embodiment.

As shown in FIG. 21 and FIG. 14, a process for carrying out a print job registered in the widget manager 24r is similar to the process of carrying out a fax sending job registered in the widget manager 24s.

However, on the widget selection screen page, a button is selected corresponding to the fax receiving widgets 23r. Therefore, a print job selection screen page displays a list of the registered print jobs in the operations panel 15 based on the list of the print job URI corresponding to the print job information registered by the fax receiving widget 23r in step S509. If one of the print jobs is selected on the print job selection screen page, the print job information corresponding to the print job is transmitted from the widget manager 24r to the provider application 124r in the image forming apparatus 10r in step S511, S512. The function controlling unit 1244r of the provider application 124r causes the image forming apparatus to carry out the print job corresponding to print job information in step S513.

Specifically, the function controlling unit 1244r sends the print data to the printer port in relation to the print application 122r via an internal communication in the image forming apparatus 10r. The print application 122r receives the print data, and determines the print data to be printed in reference to a part of the print data, and prints the print data with the printer 13r.

As described in the example shown in FIG. 17, the identifier for the image forming apparatus 10r (for example, IP address) to be monitored (polled) by the fax receiving widget is be designated in advance in a setup file of the fax receiving widget 23r.

Figure 22:
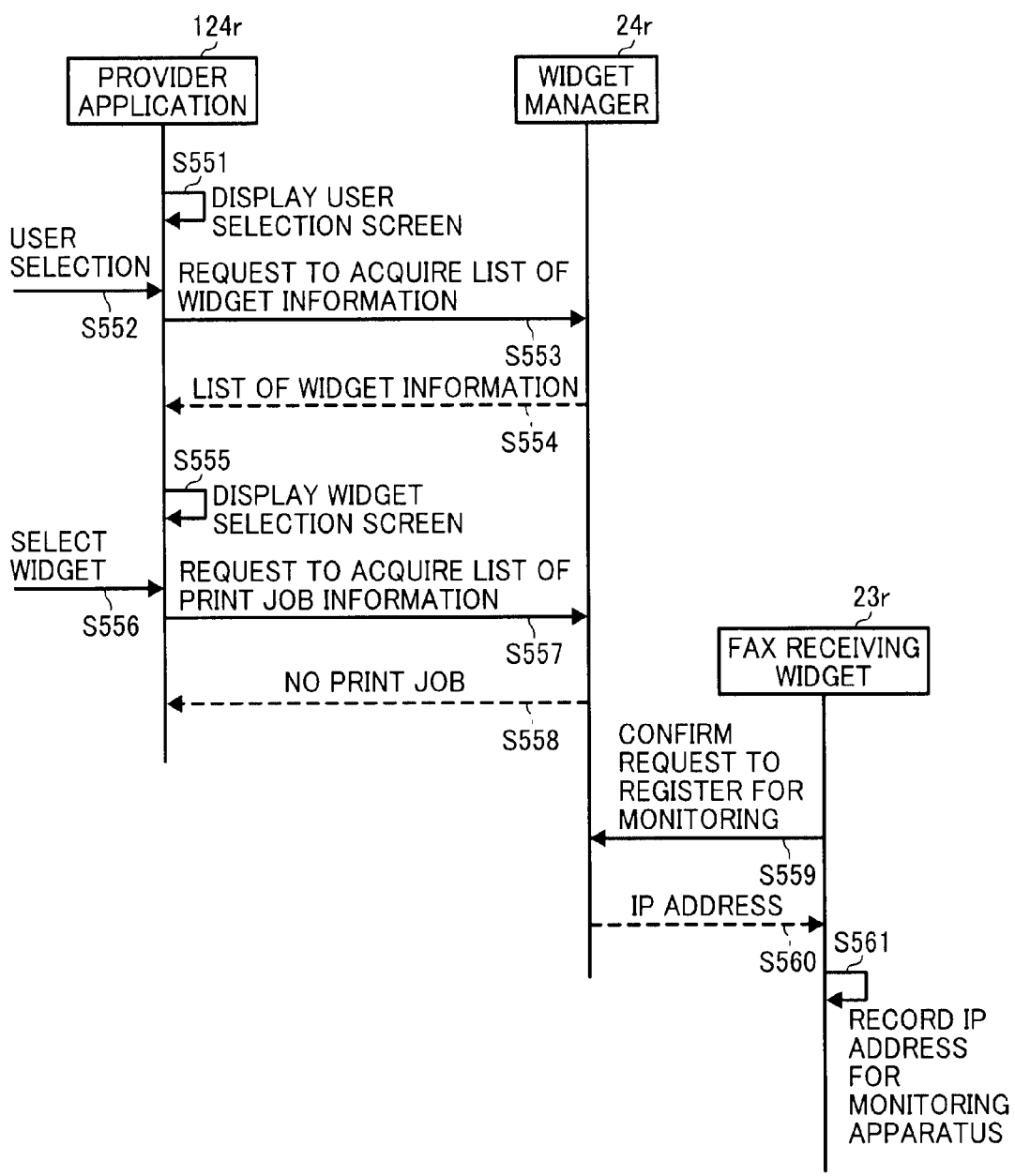
FIG. 22 is a sequence diagram showing a process performed when specifying the image forming apparatus to the fax receiving widget for monitoring.

In another example, the image forming apparatus 10r monitored by the fax receiving widget 23r may be specified by the fax receiving widget 23r according to a process shown in FIG. 22. A process similar to that shown in FIG. 9 is performed in response to the activation of each the widget manager 24r and the fax receiving widget 23r before performing the process shown in FIG. 22. Further, the process shown in FIG. 22 is performed before the process shown in FIG. 17.

FIG. 22 is a flowchart showing a process performed when specifying the image forming apparatus to the fax receiving widget for monitoring.

Steps S551-557 are similar to steps S501-507 shown in FIG. 21. Print job information is not registered by the fax receiving widget 23r at this point. Therefore, if the job list providing unit 246r of the widget manger 23r receives a request to provide a list of print jobs to the fax receiving widget URI when a print job information corresponding to the fax receiving widget URI is not registered, the job list providing unit 246r considers the request as a request to register the image forming apparatus 10r for monitoring. Then, it stores an IP address of the image forming apparatus 10r included the request associated with fax receiving widget URI. The job list providing unit 246r returns a response indicating that there is no print data in step S558.

Meanwhile, in response to the registration of the widget information to the widget manager 24r, the fax receiving widget 23r polls the fax receiving widget URI returned by the widget manager 24r to confirm whether the request to register the image forming apparatus 10r for monitoring is received in step S559. The widget manger 24r receives the polling to confirm. If there is IP address associated with the fax receiving widget URI, the widget manger 24r returns the IP address in step S560. The fax receiving widget 23r records the received IP address to a setup file as an identifier for an apparatus receiving faxes to monitor in step S61. Then, the fax receiving widget 23r starts polling the IP address after step S401 as shown in FIG. 17 (to confirm whether a fax image is received).

In another example, the barcode may not necessarily be adopted as the workflow information. A script language (character string) or a watermark may alternatively be merged into the letterhead image instead of barcode image. If an image of a character string is merged, the fax receiving widget 23r may execute an OCR process on the character string to analyze workflow information.

According to the second embodiment, it is possible that a desirable workflow for an addressee is performed without corresponding workflow information specified by user.

[Third Embodiment]

Figure 23:
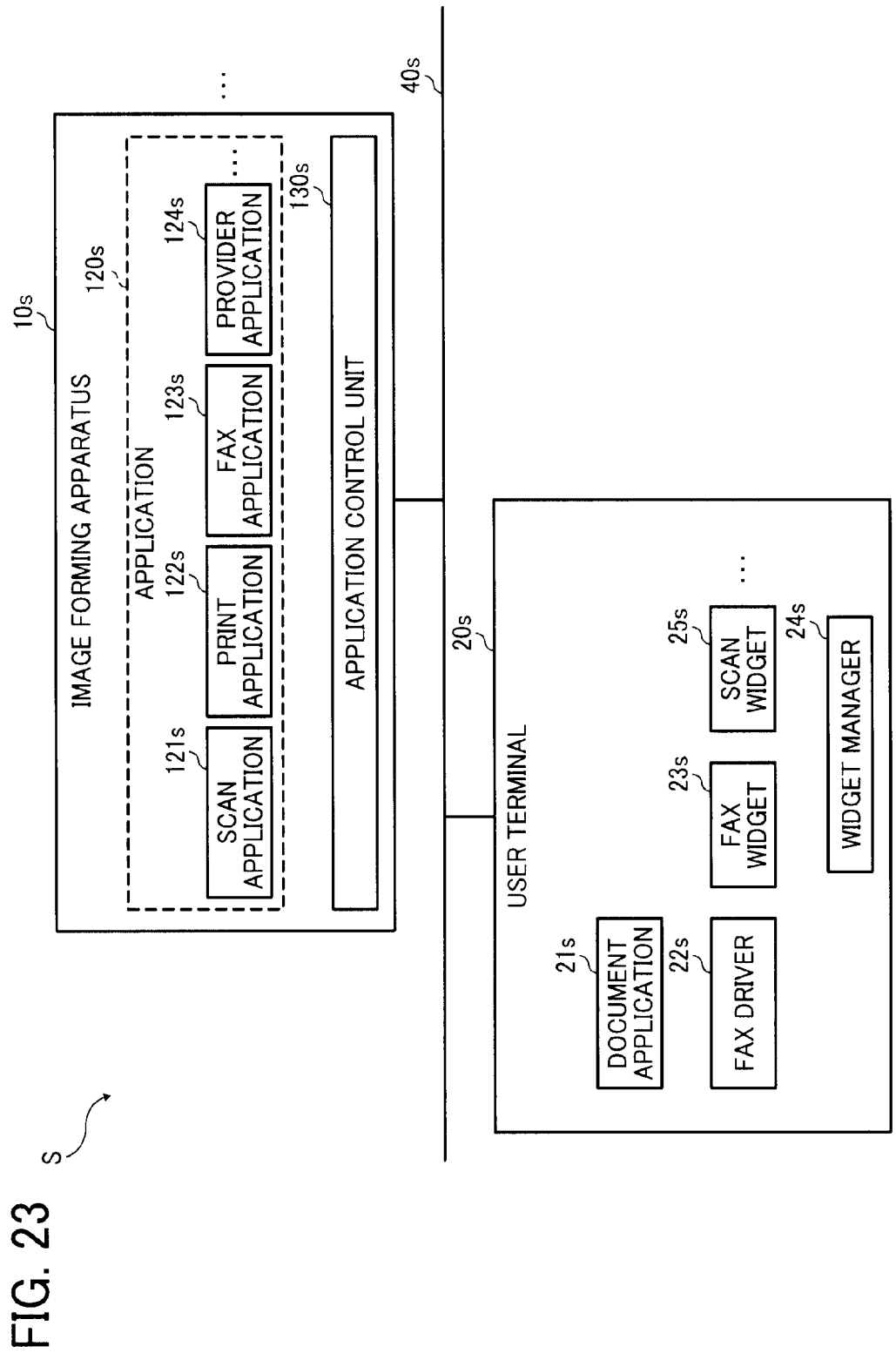
FIG. 23 illustrates a software configuration of each of the apparatuses in the fax sending environment according to the third embodiment.

FIG. 23 illustrates a software configuration of each apparatus in the fax sending environment according to the third embodiment. Common substructures of FIG. 23 and FIG. 3 share common reference numerals. Thus, the repetitive description thereof is omitted.

As shown in FIG. 23, the user terminal 20s additionally includes a scan widget 25s. In essence, the scan widget 25s causes the image forming apparatus 10s to execute a scanning process, and saves the image data obtained as a result of the scanning process in the user terminal 20s. The scan widget 25s collaborates with the fax widget 23s. Specifically, the scan widget 25s transmits image data obtained by a scanning process (scan image data) on the image forming apparatus 10s to the fax widget 23s. As a result, the scan image data is sent as fax data via the fax widget 23s and the image forming apparatus 10s.

In this case, the fax widget 23s, the scan widget 25s and the widget manager 24r are activated. Otherwise stated, a similar process to that shown in FIG. 9 has been performed. For example, the scan widget 25s registers widget information shown in FIG. 24 to the widget manager 24r in response to activation.

Figures 24, 25:
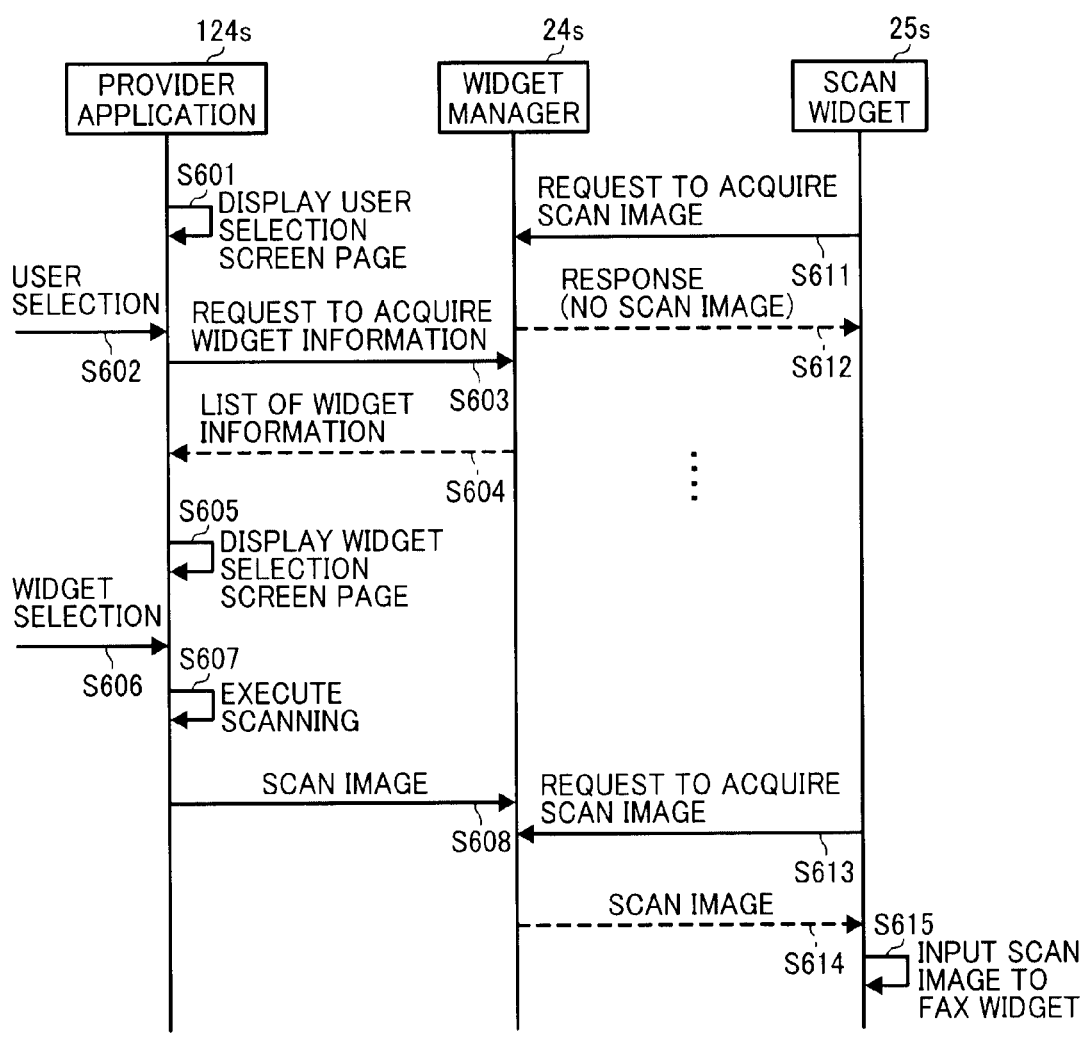
FIG. 24 illustrates a structural example of the widget information piece of the scan widget according to the third embodiment.
FIG. 25 is a flowchart showing a process performed when carrying out a scan job.

FIG. 24 illustrates an example of the widget information of the scan widget according to the third embodiment. As shown in FIG. 24, the items included in the widget information for the scan widget are similar to the items shown in FIG. 11 or 18. However, a coordination function identifier for the scan widget becomes "SCAN", since the scan widget causes the image forming apparatus 10r to carry out a scan job.

In response to a request to register widget information of the scan widget 25s, the widget manager 24s generates a scan widget URI. The widget information and the scan widget URI are mutually associated and managed by the widget manager 24s. The generated scan widget URI is returned to the scan widget 25s as a response to registration of the widget information.

FIG. 25 is a flowchart showing a process performed when carrying out a scan job.

As shown FIG. 25, steps S601-S605 are similar steps S301-305 shown in FIG. 14. However, on the widget selection screen page in step S605, a button is displayed corresponding to the scan widget 25s based on the widget information of the scan widget 25s registered in the widget manager 24s.

A user sets an original in the image forming apparatus 10, and selects the button corresponding to the scan widget 25s in the widget selection screen page (step S606). In response to the button selection, the function controlling unit 1244s of the provider application 124s recognizes that scanning is to be executed based on the coordination function identifier ("scan") included in widget information. The function controlling unit 1244s causes the scan application 121s to carry out a scan job in step S607. For example, attribute information (such as resolution, color or black-and-white) may be included the widget information of the scan widget 25s. The scan application 121s causes the scanner 12s to scan an original, and outputs the image data obtained as a result of the scanning process (hereinafter, "scan image data") to be stored in the HDD 114s, for example.

The communication controlling unit 1243S of the provider application 124s sends the scan image data to the scan widget URL in step S608. The image data sent to the scan widget URL is received by the job registering unit 243S of the widget manager 22. The received scan image and the scan widget URI are mutually associated and managed by the widget manager 24s.

Meanwhile, the scan widget 24s polls the scan widget URI to confirm whether scan image data has been obtained in response to the widget information registered at the widget manager 24s. If the scan image data is not obtained, the job transferring unit 247S returns a response indicating that there is no scan image data in step S611. If the request to confirm scan image data is sent after scan image data has been obtained (S613), the job transferring unit 247S returns a response including the scan image data in step S614.

The scan widget 25s performs a process for transmitting the scan image data to the fax widget 23s in step S615.

Specifically, the logical fax corresponding to the fax widget 23s is designated as a print destination. Then, the scan widget 25s activates the document application 21s corresponding to the scan image with a command line in which the file name of the scan image is designated as an argument, and a print process is carried out by the document application 21s. As a result, fax data for the scan image is generated by the fax driver 22s. The fax driver 22s generates an intermediate file as an output destination for the logical fax. Then, a process similar to that shown from step S352 in FIG. 16 is performed. As a result, a registration is made to the widget manager 24s that the fax sending job information includes a barcode image to be merged into the first page of the fax data as workflow information.

Thereafter, a process similar to that shown in FIG. 14 is performed. Then, the letterhead image including the merged barcode is added to a first page of the fax data, which is sent to the fax receiving environment R.

Processing procedures performed in the fax receiving environment R may be similar processing procedures described above in the second embodiment.

According to the third Embodiment, it is possible to gain similar advantages with the second embodiment, when sending faxes from originals.

[Fourth Embodiment]

Figure 26:
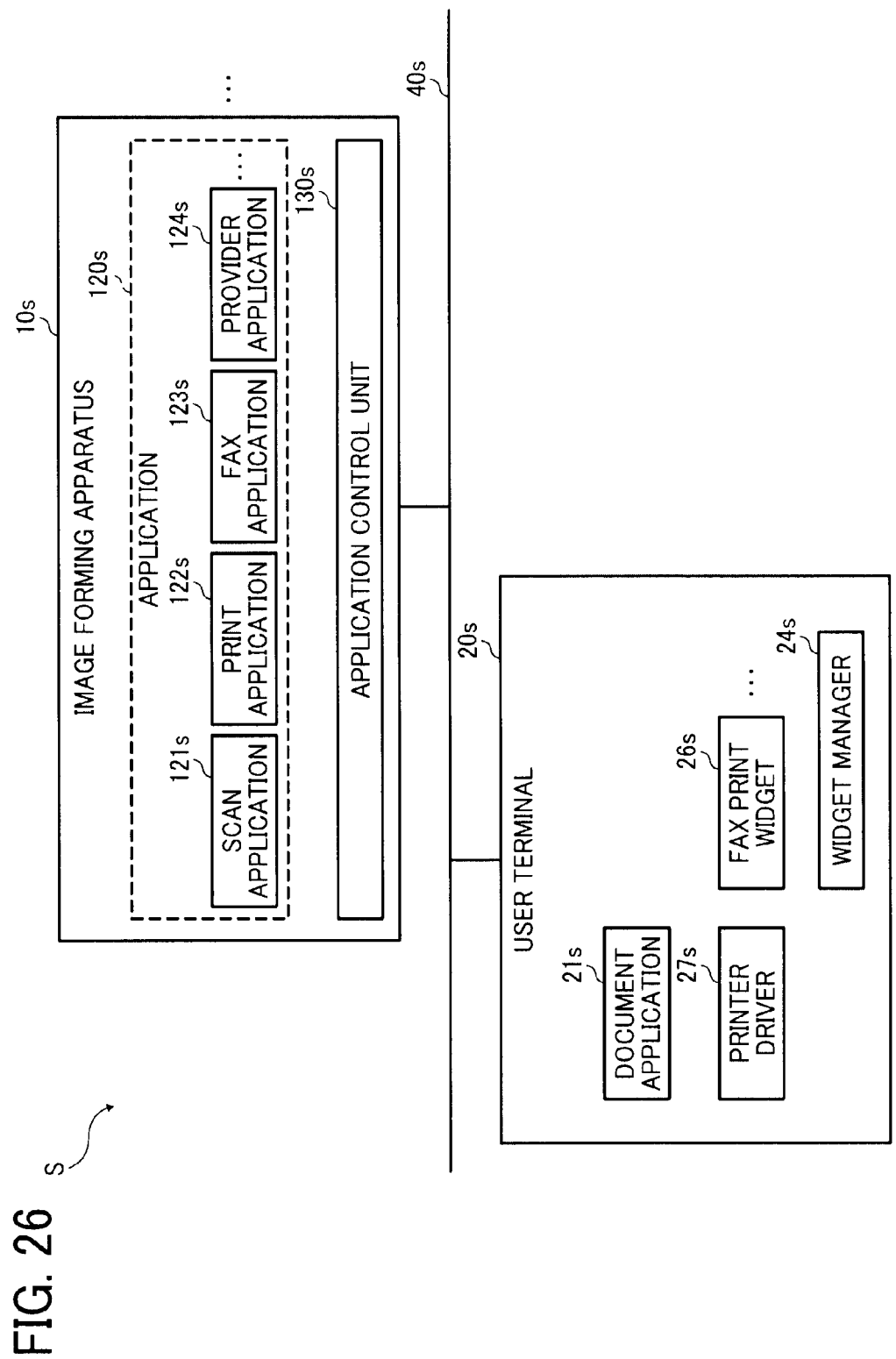
FIG. 26 illustrates a software configuration of each of the apparatuses in the fax sending environment according to the third embodiment

FIG. 26 illustrates a software configuration of each apparatus in the fax sending environment according to the fourth embodiment. Common substructures in FIGS. 26 and 23 share common reference numerals. Thus, the repetitive description thereof is omitted.

As shown in FIG. 26, the user terminal 20s additionally includes a fax print widget 26s and print driver 27s. The fax print widget arranges document data for printing in a fax format (fax data), and causes the image forming apparatus 10 to print the fax data. Specifically, to arranging the document data includes automatically adding a letterhead including a merged barcode including workflow information into a first page of the document data.

The printer driver 27s is a typical printer driver. However, the printer driver 27s is configured to output generated print data as a file having a predetermined file name, similar to the printer driver 22r shown in FIG. 15.

A process similar to that shown in FIG. 9 is performed to activate each of the widget manager 24s and the fax print widget 26s. For example, the fax print widget 23r registers widget information shown in FIG. 27 to the widget manager 24s.

FIG. 27 illustrates a structural example of the widget information corresponding to the fax print widget according to the fourth embodiment. As shown in FIG. 27, each item of widget information for the fax print widget is similar to the items shown in FIG. 11 or 18. A coordination function identifier for the fax print widget is "print", because the fax print widget causes the image forming apparatus 10r to carry out a print job.

In response to a request to register widget information of the fax print widget 26s, the widget manager 24s generates a fax print widget URI. The widget information and the fax print widget URI are mutually associated and managed by the widget manager 24s. The generated fax print widget URI is returned to the fax print widget 26s as a response to register the widget information.

FIG. 28 is a sequence diagram showing a process performed when registering the fax print job into the widget manager according to the fourth embodiment.

The logical printer corresponding to the fax print widget 23s is designated as a destination for the printer driver 27s. When print instruction related to the printer driver 27s is input into the user terminal 20s by the user who operates the document application 21, the printer driver 27s generates print data related to the document edited in the document application 21s. The printer driver 27s generates an intermediate file as an output destination for the logical printer in step S651.

A process after step S652 performs a similar to that shown after step S352 in FIG. 16. However, the process shown in FIG. 28 performs process of printing data. Therefore, the letterhead image, merged with the barcode image is added as a first page of the print data in steps S654-S656.

Print job information is then registered in step S657. In response to registering the print job information, the widget manager 24s generates a print job URI in step 660. The print job URI is returned to the fax print widget 26s in step S661.

A process to carry out the print job based on the print job information registered to the widget manager 24s is similar to the process shown in FIG. 21. However, a button is displayed corresponding to the fax print widget 26s on the widget selection screen page in step S505. If the button is selected, a process from step S511 is performed. As a result, the document data is printed with a letterhead, and a barcode including the workflow information is printed on the letterhead.

A user operates the image forming apparatus to fax the printed document with the letterhead according to a normal fax sending process. As a result, a fax image include letterhead as first page send to the fax receiving environment R.

A processing procedure in the fax receiving environment R in the fourth embodiment performs a similar processing procedure in the second embodiment. As a result, the fax receiving widget 23r performs a workflow depending on a barcode included the received fax image.

According to the fourth embodiment, it is possible that a desirable workflow for an addressee is performed with a printed document.

According to above descriptions, operability of accumulated fax jobs may be improved.

The present invention is not limited to the specific embodiments described herein, and variations and modifications may be made without departing from the scope of the present invention.

What is claimed is:

1. An image processing system comprising:
a first image forming apparatus configured to send fax data;
a second, image forming apparatus configured to receive fax data sent from the first image forming apparatus via a communication link; and
a first information processing apparatus connected to the first image forming apparatus and configured to provide the fax data to the first image forming apparatus,
the first information processing apparatus including:
an identifier adding unit configured to add an identifier indicating a process to be performed on the fax data by the second image forming apparatus; and
the first image forming apparatus including:
a data sending unit configured to control the first image forming apparatus to receive the fax data from the first information processing apparatus in response to an instruction sent from the first image forming apparatus to the first information processing apparatus, and send the fax data to the second image forming apparatus according to the identifier.

2. The system of claim 1, wherein
the identifier adding unit is configured to add an F-code to the fax data as the identifier.

3. The system of claim 1, wherein
the identifier adding unit is configured to add image data to the fax data as the identifier.

4. The system of claim 3, wherein
the image data added to the fax data is a bar code.

5. The system of claim 3, wherein
the image data added to the fax data is a character string.

6. The system of claim 3, wherein the first information processing apparatus further comprises:
a data receiving unit configured to receive data scanned at the a first image forming apparatus in response an instruction received from the image forming apparatus.

7. The system of claim 1, wherein the first information processing apparatus further comprises:
a data sending unit configured to send an advertisement from the first information processing apparatus to the first image forming apparatus indicating that the first information processing apparatus is capable of providing fax data.

* * * * *

UNITED STATES PATENT AND TRADEMARK OFFICE
CERTIFICATE OF CORRECTION

PATENT NO. : 8,767,235 B2  
APPLICATION NO. : 13/019543  
DATED : July 1, 2014  
INVENTOR(S) : Shinichi Adachi et al.

Page 1 of 1

It is certified that error appears in the above-identified patent and that said Letters Patent is hereby corrected as shown below:

On the title page, Item (54) and in the specification, Column 1, Lines 1-7, the Title is incorrect. Item (54) and Column 1 should read:

--IMAGE PROCESSING SYSTEM, IMAGE
RECEIVING APPARATUS, AND IMAGE RECEIVING
METHOD FOR MANAGEMENT OF FAX DATA PROVIDED
BY A COLLABORATION OF AN IMAGE FORMING APPARATUS
AND AN EXTERNAL APPLICATION--

Signed and Sealed this
Thirtieth Day of September, 2014

Michelle K. Lee
*Deputy Director of the United States Patent and Trademark Office*